United States Patent
Seo et al.

(10) Patent No.: US 9,698,955 B2
(45) Date of Patent: Jul. 4, 2017

(54) METHOD FOR BASE STATION TO MULITIPLEX DOWNLINK CONTROL CHANNEL IN WIRELESS COMMUNICATION SYSTEM AND APPARATUS THEREFOR

(75) Inventors: Hanbyul Seo, Anyang-si (KR);
Suckchel Yang, Anyang-si (KR);
Hakseong Kim, Anyang-si (KR);
Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 222 days.

(21) Appl. No.: 14/237,311

(22) PCT Filed: Jun. 26, 2012

(86) PCT No.: PCT/KR2012/005033
§ 371 (c)(1),
(2), (4) Date: Feb. 5, 2014

(87) PCT Pub. No.: WO2013/024967
PCT Pub. Date: Feb. 21, 2013

(65) Prior Publication Data
US 2014/0211730 A1 Jul. 31, 2014

Related U.S. Application Data

(60) Provisional application No. 61/524,309, filed on Aug. 16, 2011, provisional application No. 61/529,231, (Continued)

(51) Int. Cl.
*H04L 5/00* (2006.01)
*H04L 27/26* (2006.01)

(52) U.S. Cl.
CPC .......... *H04L 5/0053* (2013.01); *H04L 5/0007* (2013.01); *H04L 27/2607* (2013.01)

(58) Field of Classification Search
None
See application file for complete search history.

(56) References Cited

U.S. PATENT DOCUMENTS

2011/0044391 A1 2/2011 Ji et al.
2011/0170496 A1 7/2011 Fong et al.
(Continued)

FOREIGN PATENT DOCUMENTS

JP 2012-235339 11/2012
KR 2007-0121589 12/2007
(Continued)

OTHER PUBLICATIONS

LG Electronics Inc., "R-PDCCH REG mapping," 3GPP TSG RAN WG1 Meeting #63, R1-106136, Nov. 2010, 4 pages.
(Continued)

*Primary Examiner* — Dung B Huynh
(74) *Attorney, Agent, or Firm* — Lee Hong Degerman Kang Waimey

(57) ABSTRACT

Disclosed is a method for a base station to transmit a downlink control channel in a wireless communication system. Specifically, the method comprises the steps of: separating each resource block, of which there are at least one, into a preconfigured number of subsets; structuring basic resource allocation units for an downlink control channel as one of the subsets comprised in one or more resource blocks; configuring the basic resource allocation units, the number of which correspond to the aggregation level of the downlink control channel, as transmission resources; and using the transmission resource to transmit the downlink control channel to a terminal.

6 Claims, 21 Drawing Sheets

Related U.S. Application Data filed on Aug. 30, 2011, provisional application No. 61/564,827, filed on Nov. 29, 2011, provisional application No. 61/592,558, filed on Jan. 30, 2012, provisional application No. 61/614,477, filed on Mar. 22, 2012, provisional application No. 61/620,429, filed on Apr. 4, 2012, provisional application No. 61/646,882, filed on May 14, 2012.

(56) References Cited

U.S. PATENT DOCUMENTS

| | | | | |
|---|---|---|---|---|
| 2011/0244877 | A1* | 10/2011 | Farajidana | H04L 5/0023 455/452.2 |
| 2012/0058791 | A1* | 3/2012 | Bhattad | H04L 1/0606 455/509 |
| 2012/0087299 | A1* | 4/2012 | Bhattad | H04L 5/0053 370/315 |
| 2012/0120891 | A1* | 5/2012 | Mazzarese | H04W 72/042 370/329 |
| 2012/0120905 | A1* | 5/2012 | Ko | H04B 7/0413 370/329 |
| 2012/0282936 | A1* | 11/2012 | Gao | H04L 5/0023 455/450 |
| 2013/0039299 | A1* | 2/2013 | Papasakellariou | H04L 1/0073 370/329 |
| 2013/0094411 | A1* | 4/2013 | Zhang | H04W 72/04 370/281 |
| 2013/0201926 | A1* | 8/2013 | Nam | H04L 1/1685 370/329 |

FOREIGN PATENT DOCUMENTS

| | | | |
|---|---|---|---|
| KR | 2008-0030942 | 4/2008 | |
| WO | 2007/052916 | 5/2007 | |
| WO | 2010/053984 | 5/2010 | |
| WO | WO 2011019242 A2 * | 2/2011 | ........... H04B 7/0413 |
| WO | 2011/093671 | 8/2011 | |
| WO | 2013/108585 | 7/2013 | |

OTHER PUBLICATIONS

Samsung, "Issue on different REG mapping for PDCCH and R-PDCCH with cross-interleaving," 3GPP TSG RAN WG1 Meeting #65, R1-111462, May 2011, 4 pages.

European Patent Office Application Serial No. 12824209.6, Search Report dated Mar. 24, 2015, 9 pages.

ZTE, "Aspects on DL control signaling enhancements," TSG-RAN WG1 #65, R1-111521, May 2011, 4 pages.

Panasonic, "Definitions of eREG and eCCE," 3GPP TSG RAN WG1 Meeting #69, R1-122201, May 2012, 4 pages.

PCT International Application No. PCT/KR2012/005033, Written Opinion of the International Searching Authority dated Jan. 17, 2013, 16 pages.

* cited by examiner (a) Control-Plane Protocol Stack (b) User-Plane Protocol Stack (a) 1TX or 2TX (b) 4 TX (a)

(b)

METHOD FOR BASE STATION TO MULITIPLEX DOWNLINK CONTROL CHANNEL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2012/005033, filed on Jun. 26, 2012, which claims the benefit of U.S. Provisional Application Ser. No. 61/524,309, filed on Aug. 16, 2011, 61/529,231, filed on Aug. 30, 2011, 61/564,827, filed on Nov. 29, 2011, 61/592,558, filed on Jan. 30, 2012, 61/614,477, filed on Mar. 22, 2012, 61/620,429, filed on Apr. 4, 2012, and 61/646,882, filed on May 14, 2012, the contents of which are all hereby incorporated by reference herein in their entirety.

TECHNICAL FIELD

The present invention relates to a wireless access system, and more particularly, to a method and apparatus for multiplexing a downlink control channel at a base station in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies on a method and apparatus for multiplexing a downlink control channel at a base station in a wireless communication system.

Technical Solution

In an aspect of the present invention, a method for transmitting a downlink control channel at a base station in a wireless communication system includes dividing each of one or more resource blocks into a predetermined number of subsets, configuring a basic resource allocation unit for the downlink control channel with one subset included in each of the one or more resource blocks, configuring as many basic resource allocation units as an aggregation level of the downlink control channel, as transmission resources, and transmitting the downlink control channel in the transmission resources to a user equipment. The aggregation level may be 1 or 2.

The dividing of each of one or more resource blocks into a predetermined number of subsets may include sequentially allocating resource elements defined by one symbol index to the predetermined number of subsets in an order of subcarrier indexes in each of the one or more resource blocks. If the resource elements defined by one symbol index are all allocated, resource elements defined by a next symbol index may be allocated sequentially to the predetermined number of subsets in an order of subcarrier indexes. An offset having, as a factor, at least one of a symbol index, a terminal Identifier (ID), a resource block index, and a subframe index may be applied to a starting subcarrier index for allocation.

Or the dividing of each of one or more resource blocks into a predetermined number of subsets may include sequentially allocating resource elements defined by one subcarrier index to the predetermined number of subsets in an order of symbol indexes in each of the one or more resource blocks. If the resource elements defined by one subcarrier index are all allocated, resource elements defined by a next subcarrier index may be allocated sequentially to the predetermined number of subsets in an order of symbol indexes. An offset having, as a factor, at least one of a symbol index, a terminal ID, a resource block index, and a subframe index may be applied to a starting symbol index for allocation.

Subsets included in the basic resource allocation unit may have the same index or different indexes. In the latter case, the basic resource allocation unit may include a predetermined number of resource elements.

The method may further include transmitting information about the predetermined number to the user equipment.

Advantageous Effects

According to embodiments of the present invention, a base station can efficiently multiplex a downlink control channel and transmit the multiplexed downlink control channel in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

Figure 1:
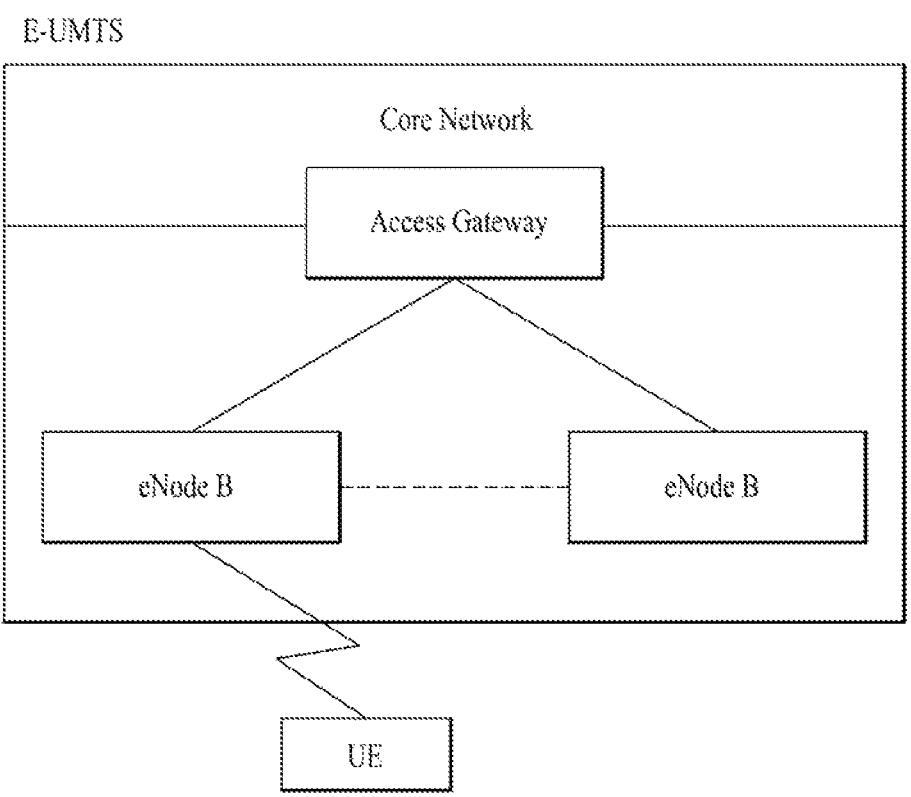
FIG. 1 illustrates a configuration of an Evolved Universal Mobile Telecommunications System (E-UMTS) network as an example of a wireless communication system.
Figure 2:
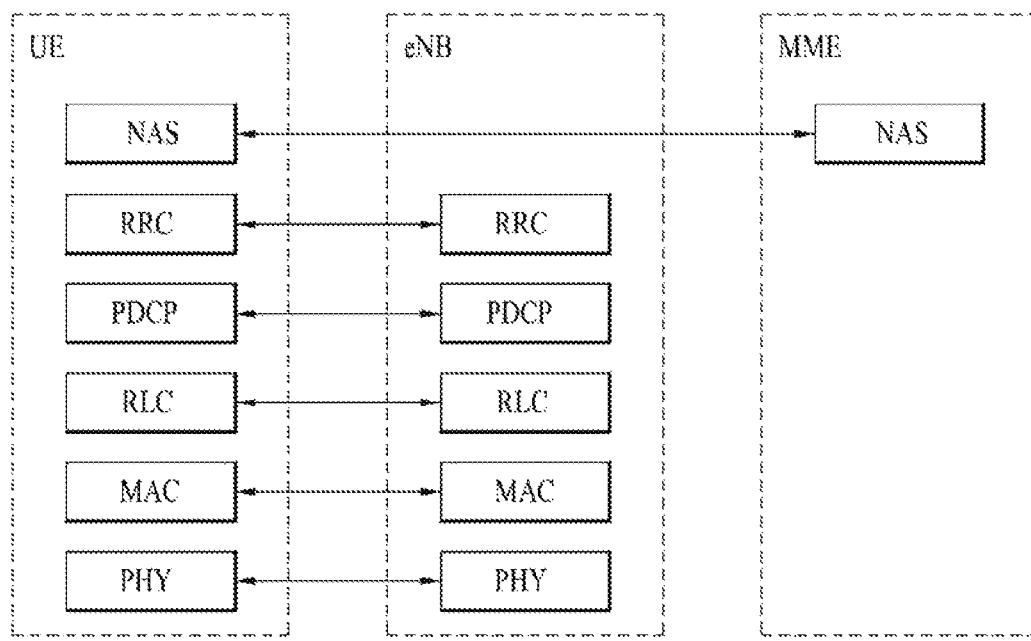
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN)
Figure 2:
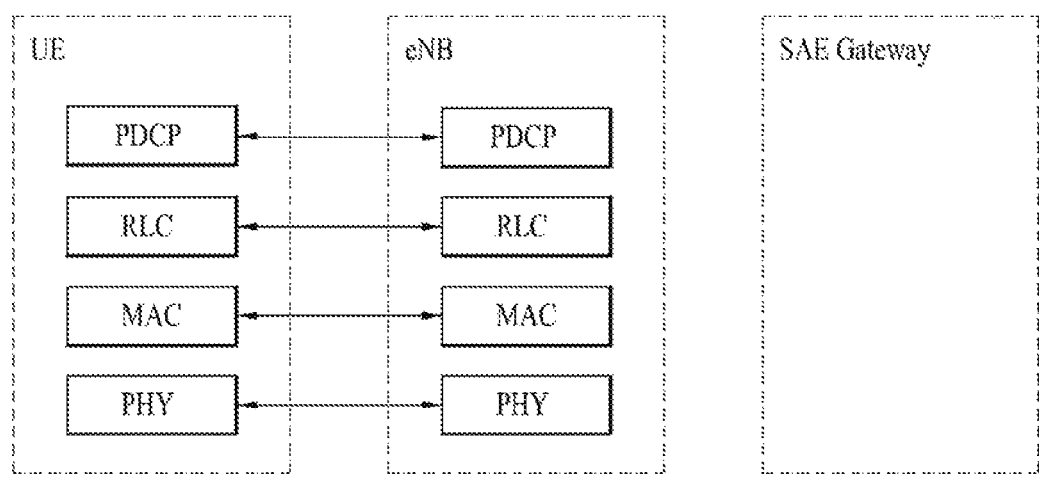

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell managed by an evolved Node B (eNB or eNode B) is set to one of bandwidths of 1.4, 3, 5, 10, 15, and 20 Mhz and provides a DL or UL service to a plurality of UEs. Different cells may be set to different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
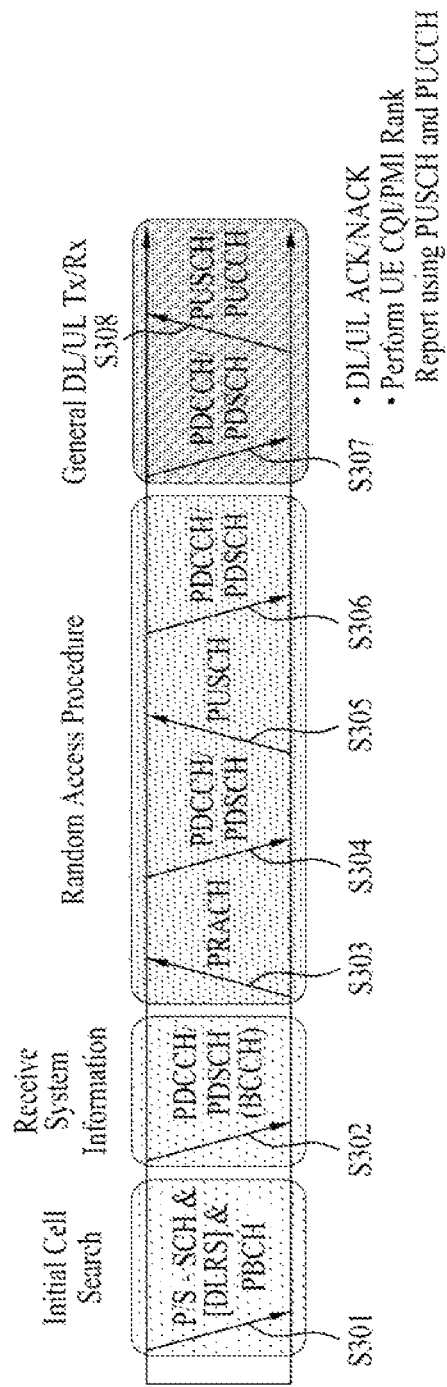
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Now a description will be given of a Multiple Input Multiple Output (MIMO) system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 4:
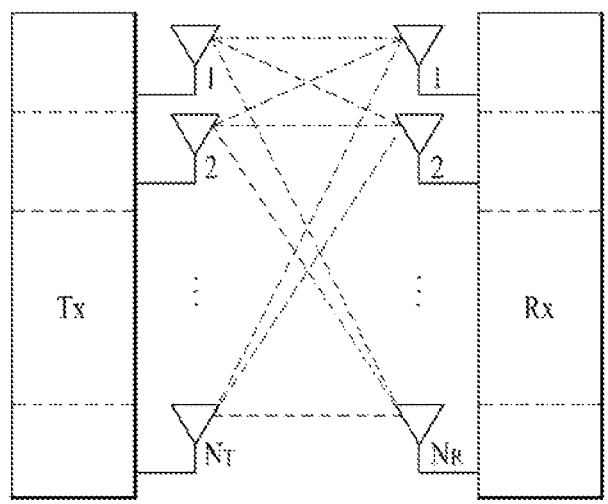
FIG. 4 illustrates a configuration of a Multiple Input Multiple Output (MIMO) communication system.

FIG. 4 illustrates the configuration of a typical MIMO communication system. Referring to FIG. 4, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 4 will be described in detail through mathematical modeling. Regarding a transmission signal, up to $N_T$ pieces of information can be transmitted through the $N_T$ Tx antennas, as expressed as the following vector.

$$S=[s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vectors by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$
$$= WPs$$

[Equation 5]

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

Figure 5:
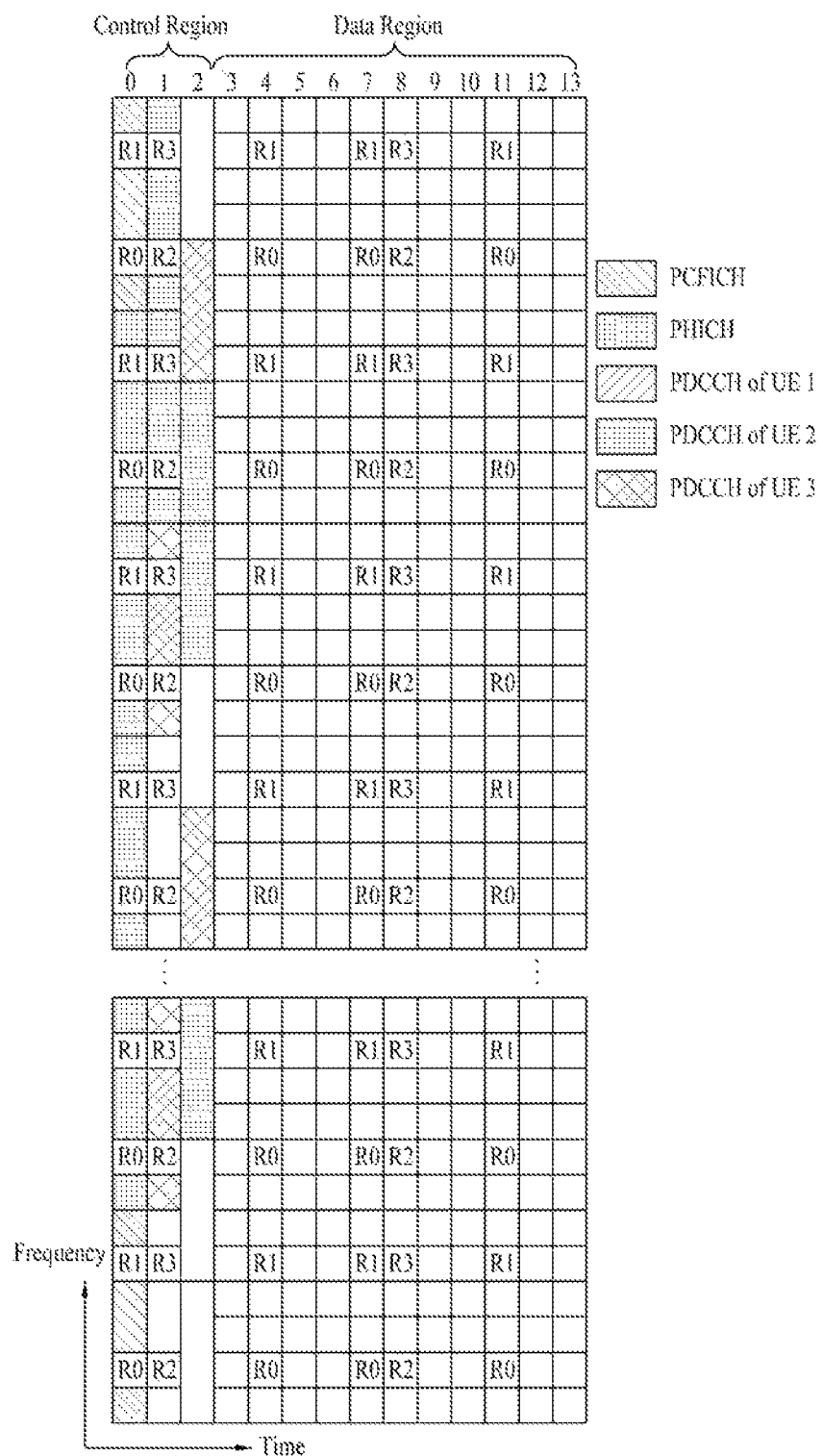
FIG. 5 illustrates a structure of a downlink radio frame in a Long Term Evolution (LTE) system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
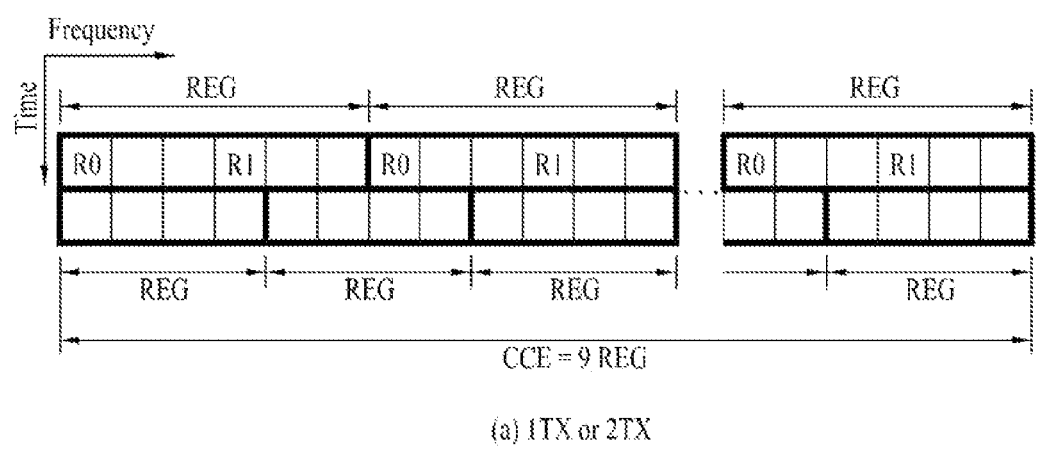
FIG. 6 illustrates resources units used for configuring a downlink control channel in the LTE system.
Figure 6:
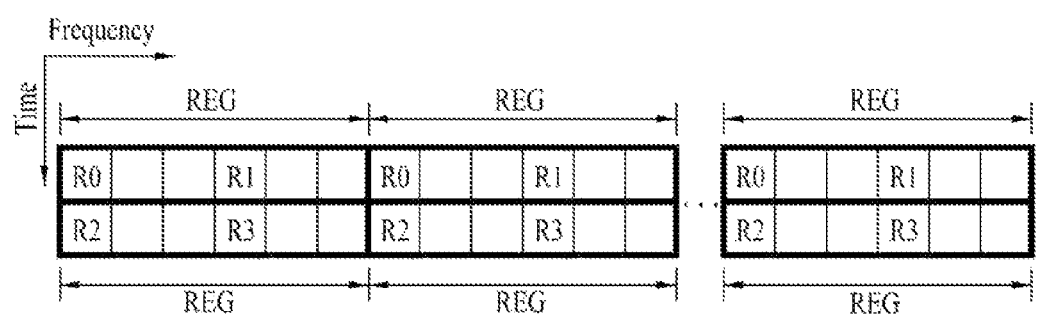

FIG. 6 illustrates REs used for configuring a DL control channel in the LTE system. Specifically, FIG. 6(a) illustrates REs of a DL control channel in the case of 1 or 2 Tx antennas in an eNB and FIG. 6(b) illustrates REs of a DL control channel in the case of 4 Tx antennas in an eNB. Although a different RS pattern is used according to the number of Tx antennas, REs are configured for a DL control channel in the same manner.

Referring to FIG. 6, a basic resource unit of a DL control channel is an REG. The REG includes four contiguous REs except for REs carrying RSs. REGs are marked with bold lines in FIG. 6. A PCFICH and a PHICH include 4 REGs and 3 REGs, respectively. A PDCCH is configured in units of a Control Channel Element (CCE), each CCE including 9 REGs.

To determine whether a PDCCH including L CCEs is transmitted to a UE, the UE is configured to monitor $M^{(L)}$ ($\geq$L) CCEs that are arranged contiguously or in a predetermined rule. L that the UE should consider for PDCCH reception may be a plural value. CCE sets that the UE should monitor to receive a PDCCH are referred to as a search space. For example, the LTE system defines search spaces as illustrated in [Table 1].

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 2B, 1D, 2, 2A, 2B, 4 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In [Table 1], L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only to a specific UE and a common search space accessible to all UEs within a cell. A UE monitors common search spaces with CCE aggregation levels 4 and 8 and UE-specific search spaces with CCE aggregation levels 1, 2, 4, and 8. A common search space and a UE-specific search space may overlap with each other.

For each CCE aggregation level, the position of the first CCE (a CCE having the smallest index) of a PDCCH search space allocated to a UE changes in every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency area of the control region of a subframe. As a control channel is configured in units of a CCE but interleaved in units of an REG, a frequency diversity gain and an interference randomization gain may be maximized.

Figure 7:
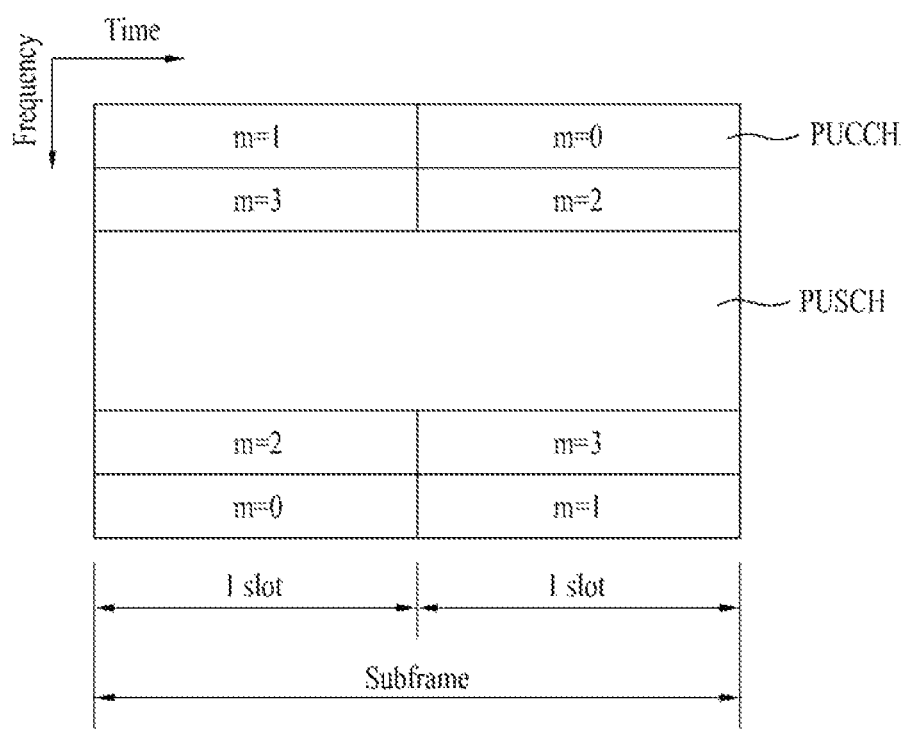
FIG. 7 illustrates a structure of an uplink radio frame in the LTE system.

FIG. 7 illustrates a structure of a UL subframe in the LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

A frame type used in a TDD system, type-2 radio frame is divided into two half frames. Each half frame includes four general subframes each including two slots and a special subframe including a Downlink Pilot Time Slot (DwPTS), a Guard Period (GP), and an Uplink Pilot Time Slot (UpPTS). In the special subframe, the DwPTS is used for initial cell search, synchronization, or channel estimation at a UE and the UpPTS is used for channel estimation and UL transmission synchronization to a UE at an eNB. That is, the DwPTS is used for DL transmission and the UpPTS is used for UL transmission. Particularly, the UpPTS is used in transmitting a PRACH preamble or a Sounding Reference Signal (SRS). The GP is a period interposed between a DL and a UL to cancel interference with the UL caused by multipath delay of a DL signal. For the special subframe, a current 3GPP standard specification defines the configurations listed in [Table 2]. [Table 2] illustrates a DwPTS and a UpPTS for $T_s=1/(15000\times2048)$ and the remaining area is set as a GP.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Due to emergence and proliferation of various devices requiring Machine-to-Machine (M2M) communication and a large amount of data, the amount of required data over a cellular network is increasing very fast in a current wireless communication environment. To satisfy the high data amount requirement, communication technology is being developed to carrier aggregation that enables efficient use of more frequency bands, MIMO that increases a data capacity in a limited frequency, Coordinated Multi-Point (COMP), etc. Furthermore, the communication environment is evolving toward highly populated nodes accessible to users. A system having highly populated nodes may increase system performance through cooperation between nodes. This technology has very excellent performance, relative to a non-cooperative case where each node serves as an independent Base Station (BS), Advanced BS (ABS), Node B, eNB, Access Point (AP), or the like.

Figure 8:
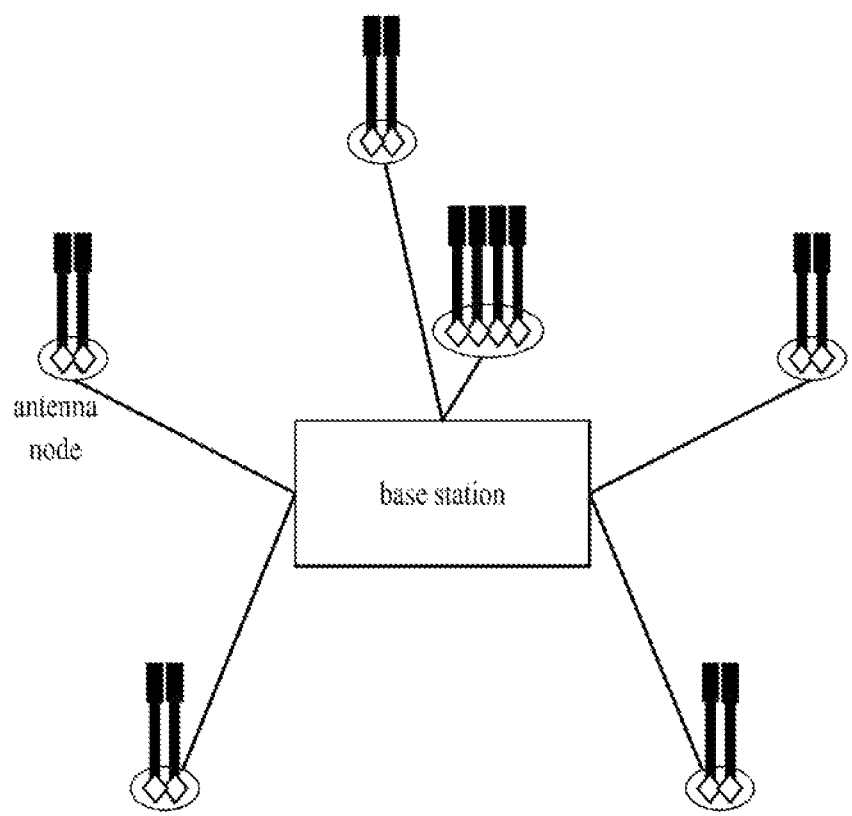
FIG. 8 illustrates a configuration of a multi-node system as a future-generation communication system.

FIG. 8 illustrates a configuration of a multi-node system as a future-generation communication system.

Referring to FIG. 8, if all nodes collectively operate as an antenna set of a cell, with their transmission and reception under control of a controller, this system may be regarded as a Distributed Multi-Node System (DMNS) forming one cell. The individual nodes may be allocated node IDs or may operate as antennas of the cell without node IDs. However, if the nodes have different cell IDs, this system may be regarded as a multi-cellular system. If multiple cells are overlaid according to their coverage, this is called a multi-tier network.

Meanwhile, a node may be any of a Node B, an eNB, a Picocell eNB (PeNB), a Home eNB (HeNB), a Remote Radio Head (RRH), a relay, a distributed antenna, etc. At least one antenna is installed in one node. A node is also called a transmission point. While a node refers to an antenna group with antennas apart from each other by a predetermined distance or farther, the present invention may be implemented even though a node is defined as an antenna group irrespective of the distance between antennas.

Owing to the introduction of the afore-described multi-node system and relay nodes, various communication techniques have become available, thereby improving channel quality. However, to apply MIMO and inter-cell cooperative communication technology to a multi-node environment, a new control channel is required. In this context, Enhanced PDCCH (E-PDCCH) is under discussion and it is regulated that the E-PDCCH is allocated to a data region (hereinafter, referred to as a PDSCH region) other than a legacy control region (hereinafter, referred to as a PDCCH region). Since the E-PDCCH enables transmission of control information about a node to each UE, shortage of the legacy PDCCH region may be overcome. The E-PDCCH may be accessible only to LTE-A UEs, not to legacy UEs.

Figure 9:
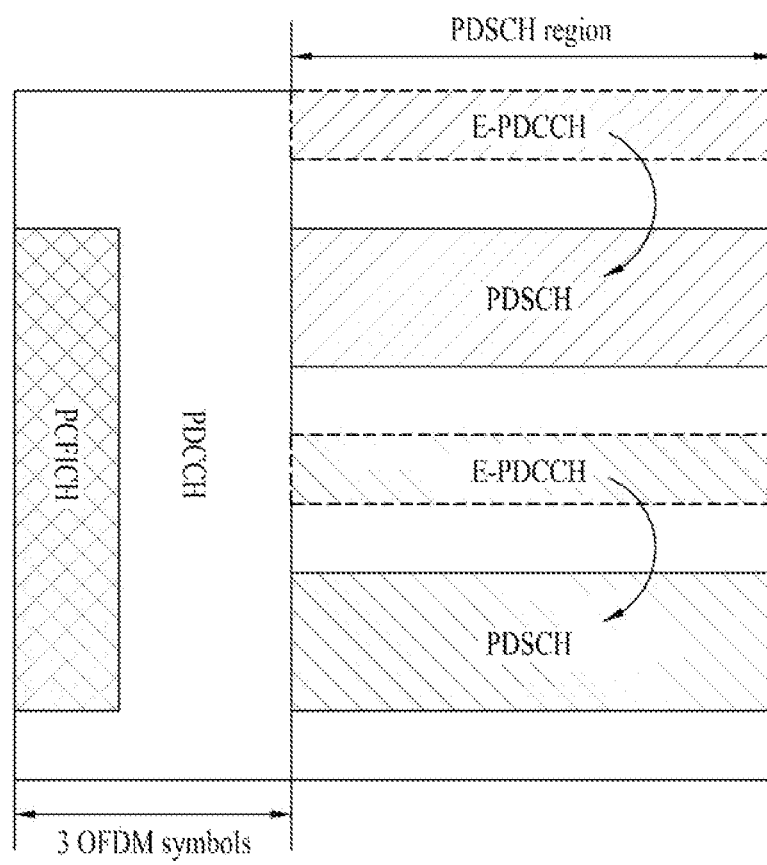
FIG. 9 illustrates an example of an Enhanced Physical Downlink Control Channel (E-PDCCH) and a Physical Downlink Shared Channel (PDSCH) scheduled by the E-PDCCH.

FIG. 9 illustrates an example of an E-PDCCH and a PDSCH scheduled by the E-PDCCH.

Referring to FIG. 9, an E-PDCCH may occupy a part of a PDSCH region that typically carries data. A UE should perform blind decoding to determine the presence or absence of an E-PDCCH directed to the UE. The E-PDCCH functions to schedule (i.e. PDSCH and PUSCH control) like a legacy PDCCH. However, if more UEs are connected to nodes such as RRHs and thus more E-PDCCHs are allocated to the PDSCH region, the UE should perform more blind decodings, thus experiencing increased complexity.

The present invention proposes a multiplexing method for increasing a diversity gain, when an E-PDCCH is transmitted. As described before, an E-PDCCH is transmitted in OFDM symbols (of a data region) following a PDCCH. Accordingly, to enable data channel decoding after early decoding of control channels, it may be regulated that the E-PDCCH is transmitted only in some starting symbols of the data region. On the other hand, if channel decoding is time-tolerant, any symbol or some last symbols are available to the E-PDCCH. Like the PDSCH, it is preferable to transmit the E-PDCCH in an aggregate of PRBs, occupying only selective resources in the frequency domain, because the E-PDCCH may be multiplexed with the PDSCH without problems.

Figure 10:
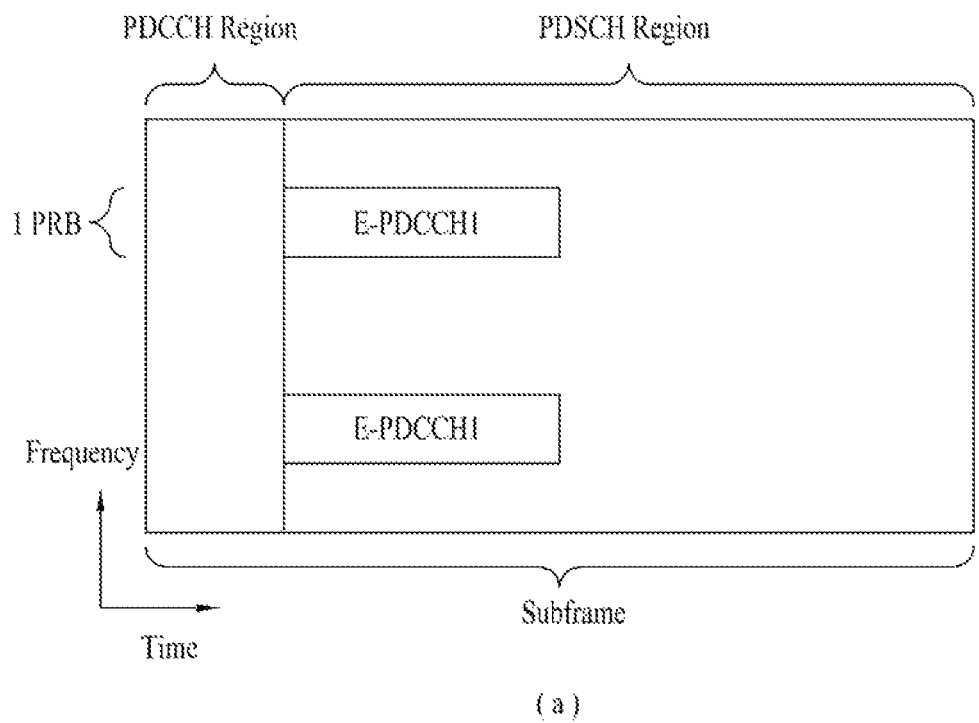
FIG. 10 conceptually illustrates an E-PDCCH aggregation level according to an embodiment of the present invention.
Figure 10:
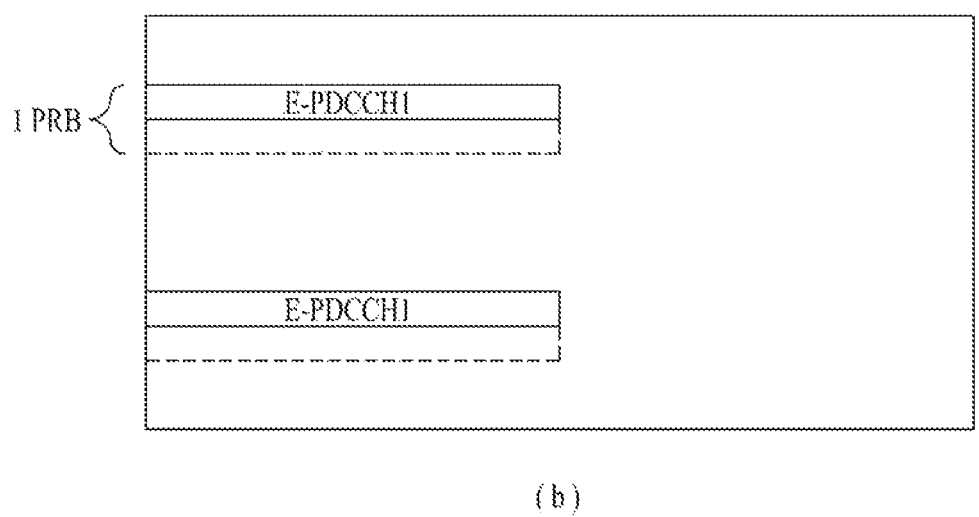

FIG. 10 conceptually illustrates an E-PDCCH aggregation level according to an embodiment of the present invention.

Referring to FIG. 10, if the aggregation level of an E-PDCCH is low (the aggregation level of the E-PDCCH may refer to the number of PRBs occupied by the single E-PDCCH), a sufficient frequency diversity gain may not be achieved. For example, if the E-PDCCH is configured with aggregation level 1 as illustrated in FIG. 10(a), the E-PDCCH is transmitted only in one PRB having 12 contiguous subcarriers. Thus, if the PRB instantaneously gets poor in channel state, reception of the entire control channel may be failed.

To solve the problem, a part of the resources of a single PRB are allocated to an E-PDCCH and required extra resources for the E-PDCCH are acquired from a part of the resources of another PRB apart enough from the PRB in the present invention, as illustrated in FIG. 10(b). Consequently, the E-PDCCH is transmitted in the same amount of resources as illustrated in FIG. 10(a), with a frequency diversity gain. Further, resources occupied by an E-PDCCH in one PRB may be defined in various manners. For example, odd-numbered subcarriers or even-numbered subcarriers of one PRB may be used for one E-PDCCH, unlike the case illustrated in FIG. 10(b).

In accordance with an embodiment of the present invention, the REs of one PRB may be divided into a plurality of subsets (referred to as Enhanced REGs (E-REGs)), and an E-PDCCH may be transmitted, using one of the subsets as a basic resource allocation unit for the E-PDCCH. That is, an E-CCE may be configured with one or more subsets (or one or more E-REGs) and the E-PDCCH may be transmitted in an aggregate of as many E-CCEs as an aggregation level. For example, E-PDCCHs with aggregation levels 1, 2, 4, and 8 are transmitted in 1, 2, 4, and 8 E-CCEs, respectively.

Figure 11:
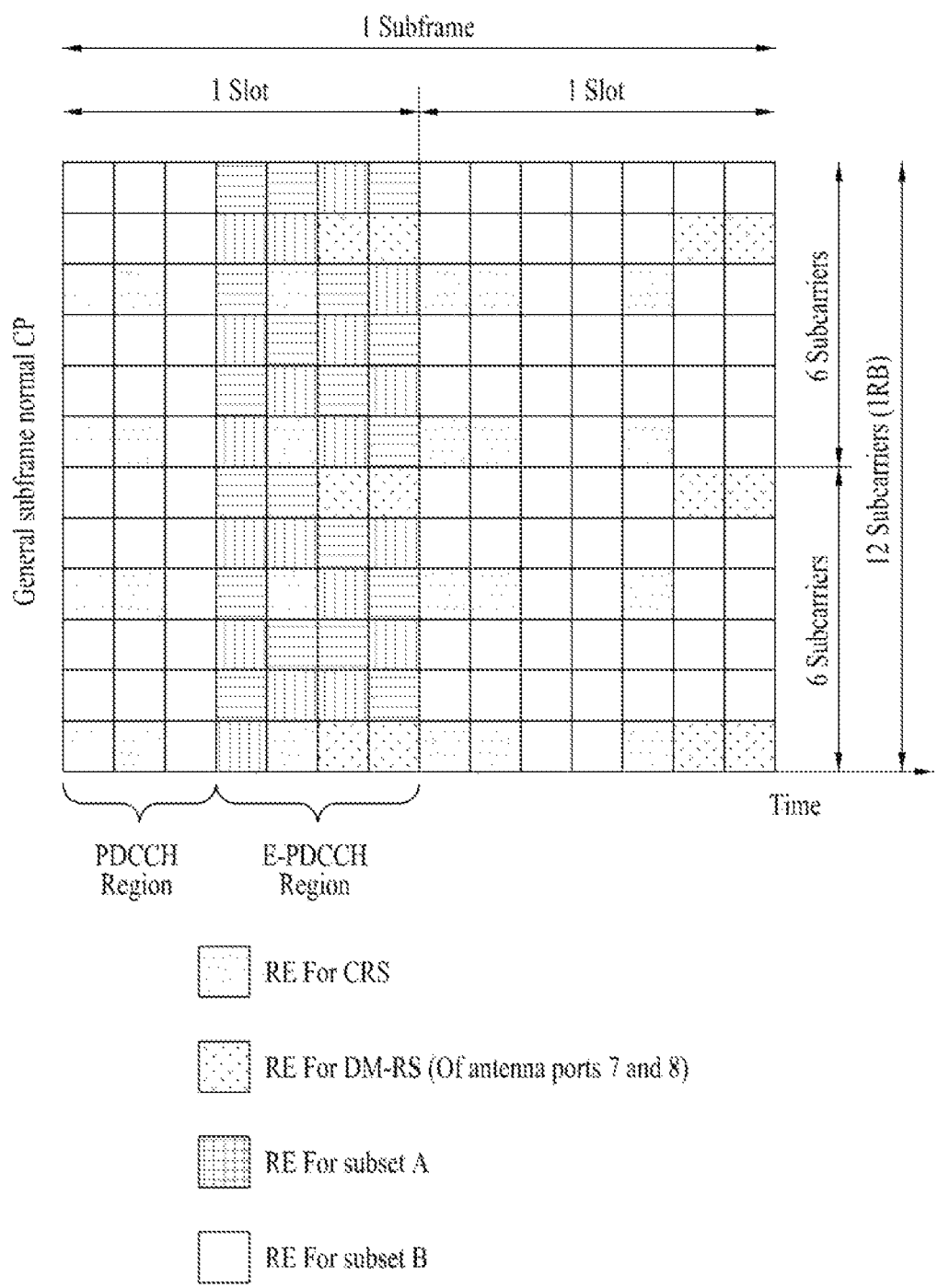
FIG. 11 illustrates Resource Elements (REs) occupied by an E-PDCCH in one Physical Resource Block (PRB) according to an embodiment of the present invention.

FIG. 11 illustrates an example of REs occupied by an E-PDCCH in one PRB according to an embodiment of the present invention.

In a subset configuration scheme illustrated in FIG. 11, available REs are allocated alternately to two subsets in a frequency-first mapping manner.

While the following description is given under the assumption that REs of one PRB are divided into two subsets as illustrated in FIG. 11, it is clearly to be understood that the present invention is also applicable to a case where REs of one PRB is divided into three or more subsets. In addition, the positions of REs carrying Cell-Specific RSs (CRSs) or DeModulation RSs (DM-RSs) are purely exemplary and the number and positions of CRS REs or DM-RS REs may vary according to a subframe configuration and a PDSCH transmission rank that are set by an eNB.

According to the present invention, since REs of each PRB are divided into subsets with which to configure an E-PDCCH, the E-PDCCH is eventually transmitted in more PRBs, using the same number of REs. For example, in the illustrated case of FIG. 10(b), an E-PDCCH with aggregation level 1 may be transmitted in two PRBs, using subset A in the upper PRB and subset B in the lower PRB. An E-PDCCH may occupy the same subset in each of transmitted PRBs or may occupy subsets of the transmitted PRBs alternately through circular shifting in order of the RBs. Particularly, if a single E-PDCCH is transmitted in a cyclically shifted subset of each of a plurality of PRBs (or each PRB of a PRB pair), it is helpful to maintain the total number of REs occupied by the single E-PDCCH to be constant.

Figure 12:
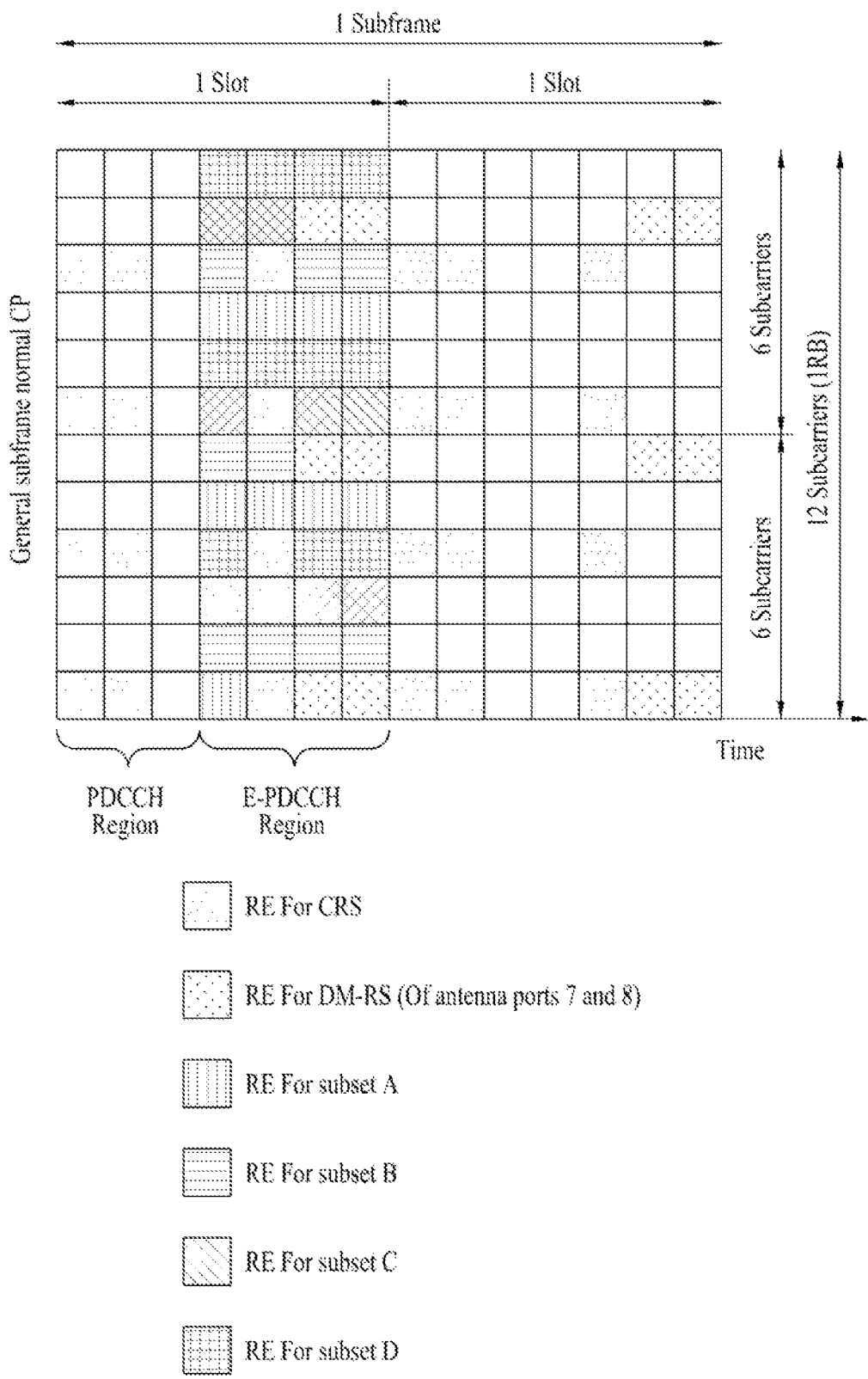
FIGS. 12 and 13 illustrate REs occupied by an E-PDCCH in one PRB according to embodiments of the present invention.
Figure 13:
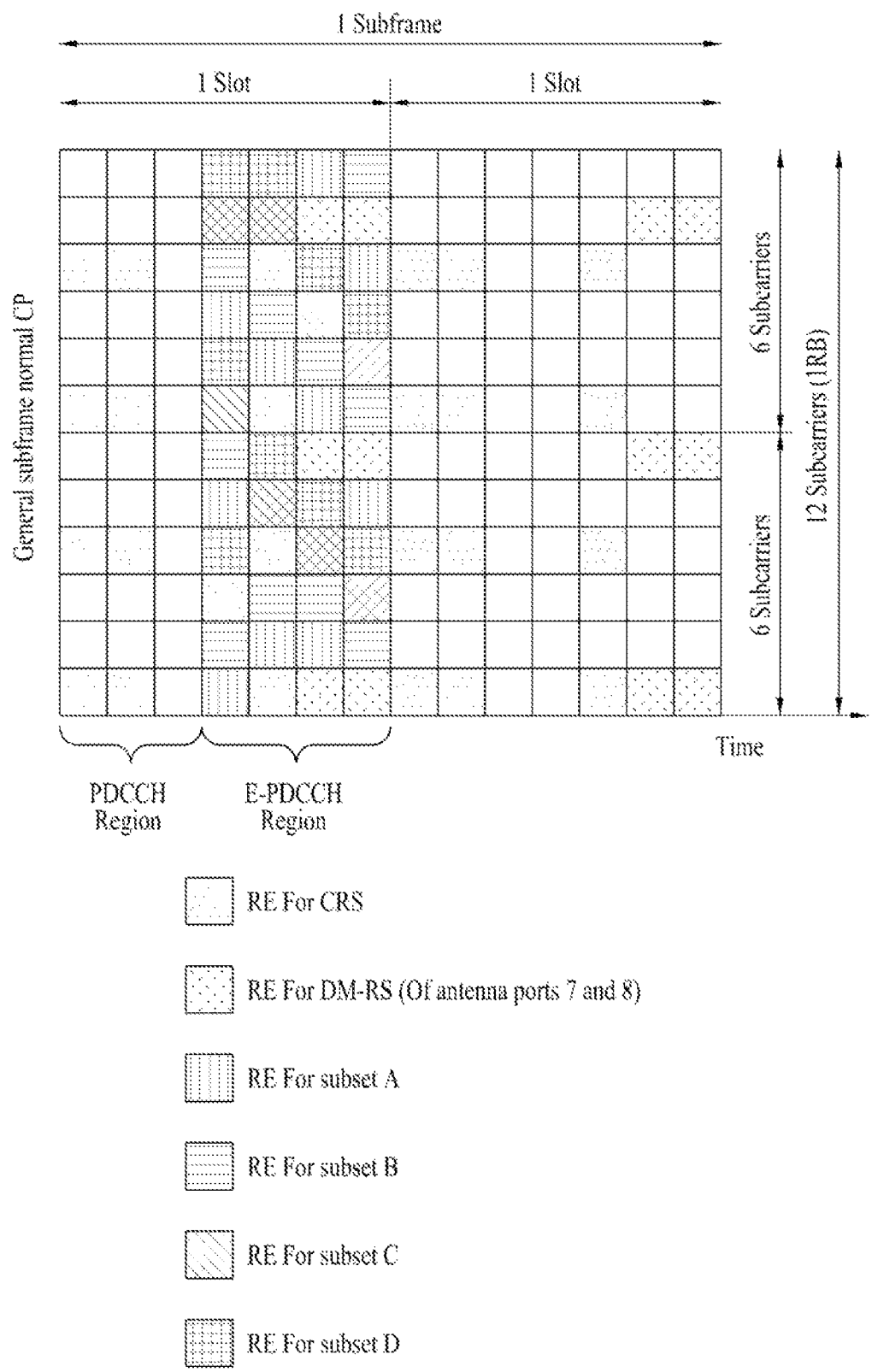

FIGS. 12 and 13 illustrate examples of REs occupied by an E-PDCCH in one PRB according to embodiments of the present invention. Particularly, it is assumed in FIGS. 12 and 13 that an E-PDCCH is transmitted in the first slot of a subframe and a PRB of the first slot is divided into four subsets (subset A, subset B, subset C, and subset D), for transmitting different E-PDCCHs.

Referring to FIG. 12, each subset includes three subcarriers in a single PRB. The number of occupied REs varies depending on subsets. In FIG. 12, each of subset A, subset B, and subset C occupies 9 REs, whereas subset D occupies 11 REs.

FIG. 13 illustrates another method for dividing a single PRB into four subsets. Each of the subsets gets one RE out of every four REs from among available REs in a frequency-first mapping manner Thus, each of subset A and subset B occupies 10 REs, whereas each of subset C and subset D occupies 9 REs.

In the case where a single E-PDCCH is transmitted across four PRBs, using one subset of each PRB in this situation, if the E-PDCCH uses the same subset in each PRB, the total number of REs occupied by the E-PDCCH varies depending on the used subset. Accordingly, subset selection affects the success probability of E-PDCCH transmission.

As proposed by the present invention, if a single E-PDCCH uses a different subset in each PRB, the E-PDCCH always occupies a constant number of REs, thus maintaining the success probability of E-PDCCH transmission to be constant. For example, if a single PRB is divided into four subsets as illustrated in FIG. 12 or FIG. 13 and a single E-PDCCH is transmitted in PRB 1, PRB 2, PRB 3, and PRB 4, the E-PDCCH is configured with subset A, subset B, subset C, and subset D in the respective PRBs. That is, the E-PDCCH is configured to use subset A in PRB 1, subset B in PRB 2, subset C in PRB 3, and subset D in PRB 4.

In another method for performing a similar operation to the above-described operation, one PRB set is configured by concatenating a plurality of PRBs and divided into subsets and an E-PDCCH is transmitted in one of the subsets. The plurality of concatenated PRBs may be successive in the frequency domain or may be distributed in the frequency domain to maximize a diversity gain. Particularly, PRBs contiguous in terms of Virtual Resource Blocks (VRBs) may be concatenated in a distributed PRB mapping scheme of the 3GPP LTE system, so that these VRBs are PRBs actually distributed in the frequency domain.

Figure 14:
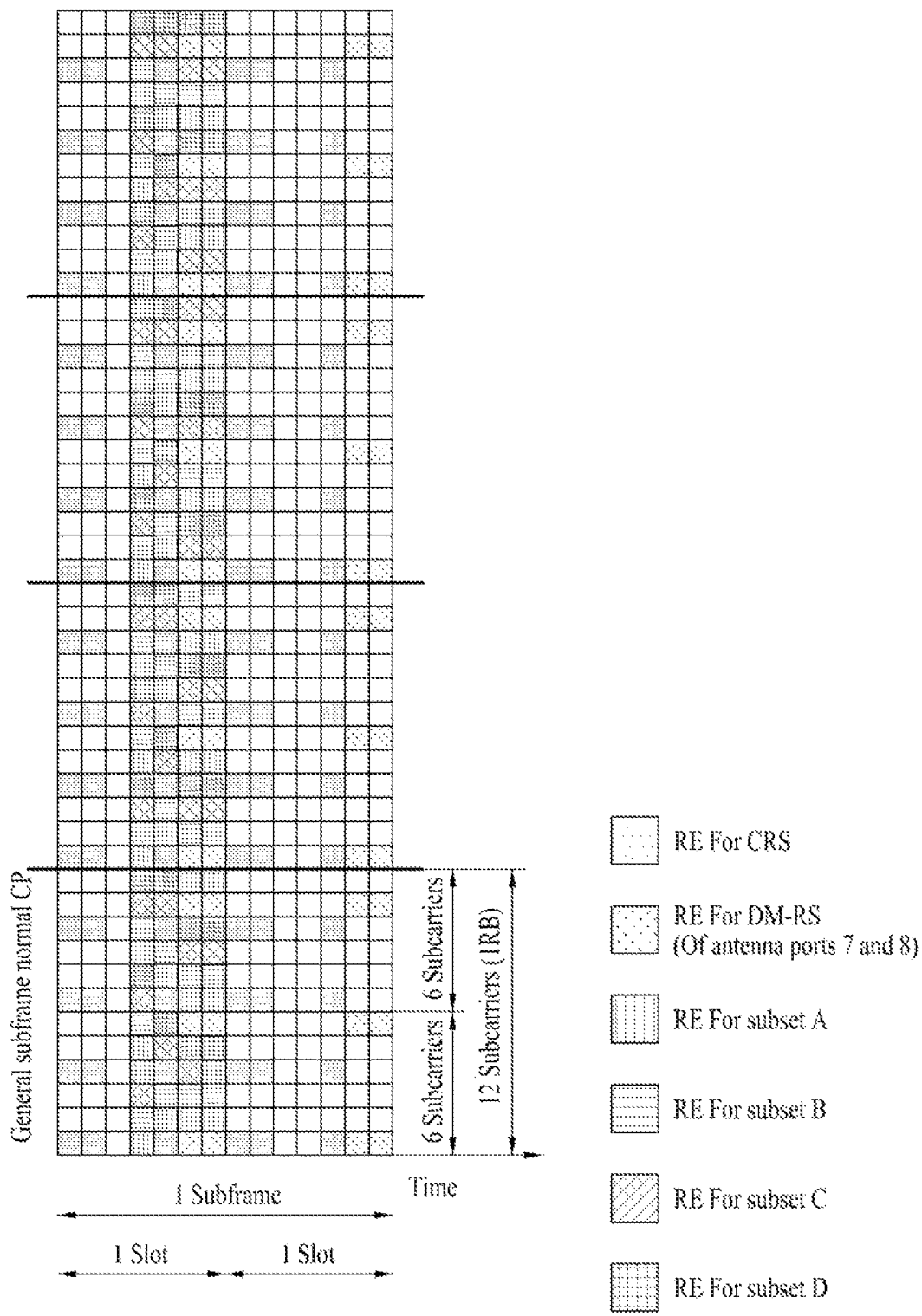
FIG. 14 illustrates an application of the illustrated case of FIG. 13 to four contiguous PRBs.

FIG. 14 illustrates an example of applying the illustrated case of FIG. 13 to four contiguous PRBs. Specifically, FIG. 14 illustrates a case where a subset is configured with one out of every four REs in a frequency-first mapping manner from among available REs of four PRBs. In this manner, each of subset A, subset B, subset C, and subset D may be configured to include the same number of REs.

The afore-described subset-based E-PDCCH transmission is effective in achieving a diversity gain at a low aggregation level in the frequency domain. However, since a plurality of PRBs are affected, the subset-based E-PDCCH transmission is preferably limited to a specific case. That is, an E-PDCCH with a low aggregation level is transmitted with frequency diversity by selecting one subset from each PRB, whereas an E-PDCCH with a high aggregation level is transmitted by selecting a plurality of subsets from each PRB, to thereby prevent the number of PRBs carrying the E-PDCCH from increasing too much.

Specifically, the subset-based E-PDCCH transmission may be limited to a predetermined aggregation level or lower (e.g., aggregation level 1 or aggregation 2 or below) and/or to distributed PRB mapping (e.g., PRB indexes are determined for an E-PDCCH by a Distributed Virtual Resource Block (DVRB) scheme of the 3GPP LTE system).

For example, if the subset-based E-PDCCH transmission scheme of the present invention is limited to E-PDCCH transmission with aggregation level 1, an E-PDCCH with aggregation level 1 is transmitted in two PRBs, using two subsets each including a half of the resources of one PRB, and an E-PDCCH with aggregation level 2, 4, or 8 is transmitted in 2, 4, or 8 full PRBs. In other words, in the case where one PRB is divided into two subsets for aggregation level 1, an E-PDCCH with aggregation level 2, 4, or 8 is configured to occupy full PRBs by using two subsets of each of the PRBs. Herein, the channel measurement complexity of a UE in blind decoding may be reduced by setting the same two PRBs for aggregation levels 1 and 2 (or by establishing a PRB inclusive relationship between aggregation level 1 and aggregation level 2).

In another example, if the subset-based E-PDCCH transmission scheme of the present invention is limited to E-PDCCH transmission with aggregation level 2 or lower, an E-PDCCH with aggregation level 1 is transmitted in two PRBs, using two subsets each occupying a half of the resources of one PRB, and an E-PDCCH with aggregation level 2 is transmitted in four PRBs, using four subsets each occupying a half of the resources of one PRB. On the other hand, an E-PDCCH with aggregation level 4 or 8 is transmitted in 4 or 8 full PRBs. Herein, the same four PRBs may be set for aggregation levels 2 and 4 (or a PRB inclusive relationship may be established between aggregation level 2 and aggregation level 4).

In another example, in the case where one PRB is divided into four subsets and the subset-based E-PDCCH transmission scheme of the present invention is limited to E-PDCCH transmission with aggregation level 2 or lower, an E-PDCCH with aggregation level 1 is transmitted in four PRBs, using four subsets each including ¼ of the resources of one PRB, an E-PDCCH with aggregation level 2 is transmitted in four PRBs, using eight subsets each from one PRB, and E-PDCCHs with aggregation levels 4 and 8 are transmitted respectively in full 4 and 8 PRBs. Likewise, the same four PRBs may be set for aggregation levels 1, 2, and 4 (or a PRB inclusive relationship may be established among aggregation levels 1, 2, and 4).

To adjust the operation range of the present invention under circumstances, a subset-based E-PDCCH transmission range (e.g. an aggregation level, a VRB-PRB mapping rule, etc.) may be preset by a higher-layer signal such as an RRC signal.

While the above description has been given in the context of a PRB as a basic transmission unit of an E-PDCCH, the operation principle of the present invention is not limited thereto. The basic transmission unit of an E-PDCCH may be set to be a more generalized form. For example, an E-CCE may be defined as a basic transmission unit for an E-PDCCH and thus the E-PDCCH may be transmitted in one E-CCE or in an aggregate of a plurality of E-CCEs. One PRB pair is divided into one or more E-CCEs and one E-CCE is a basic unit of an E-PDCCH in the PRB pair. However, to achieve frequency diversity within an E-CCE, the E-CCE may be divided into a plurality of subsets. Characteristically, an E-PDCCH may be transmitted in subsets defined in different PRB pairs.

This operation may mean that one PRB pair is divided into a plurality of subsets and an E-CCE is defined as a combination of one or more of the subsets. Accordingly, if a frequency diversity gain is required, an E-CCE (or an E-PDCCH) is configured by grouping subsets defined in different PRB pairs. In this context, the above-described PRB-based operation may correspond to an embodiment of operating based on an E-CCE including subsets defined in the same PRB pair and the subset-based operation may be an embodiment of operating based on an E-CCE including subsets defined in different PRB pairs.

The operation principle of the present invention in the case of an E-CCE defined as a basic unit of an E-PDCCH will be described in detail.

As described before, if one PRB pair is divided into a plurality of subsets, each subset may have a different number of REs. When one E-CCE is configured by combining a plurality of subsets, the positions of subsets forming one E-CCE may be different in different PRBs in order to maintain the number of REs per an E-CCE configuration to be constant as much as possible.

For example, in the case where each of PRB pair 1 and PRB pair 2 is divided into 8 subsets, subset 0 to subset 7 and one E-CCE is configured with two subsets, if a specific E-CCE occupies subset a in PRB pair 1, the specific E-CCE occupies subset b with a different index from subset a in PRB pair 2.

If some subsets of each PRB have the same number of REs but other subsets have different numbers of REs, setting different indexes for subset a and subset b is not sufficient. Therefore, it is preferable to select one of subsets having different numbers of REs from subset a from PRB pair 2, as subset b.

For this purpose, an eNB may indicate subsets with which to configure one E-CCE to a UE by higher-layer signaling, or subsets may be selected for configuring an E-CCE based on a UE ID, a cell ID, or an E-PDCCH-related parameter (e.g., a parameter that resets a scrambling sequence used for E-PDCCH detection) according to a predetermined rule.

In addition, if the number of available REs is changed according to CRSs, CSI-RSs, a legacy PDCCH length, a DwPTS length, etc. in a subframe, the number of subsets forming one E-CCE may be changed according to the number of available REs to keep the number of REs in an E-CCE constant.

An operation for achieving a frequency diversity gain by configuring an E-CCE with subsets from different PRB pairs may be limited to a case where an aggregation level is equal to or lower than a predetermined value.

For example, if one PRB pair is divided into 8 subsets, subset 0 to subset 7, an E-CCE is configured for aggregation level 1 by selecting/combining one subset from each of two PRB pairs and an E-PDCCH is transmitted in the E-CCE. As a result, a frequency diversity order of 2 may be achieved at aggregation level 1.

On the other hand, to prevent transmission of an E-PDCCH with aggregation level 2 in too many PRB pairs, the frequency diversity order of 2 may be maintained (i.e. transmission of a single E-PDCCH is restricted to two PRB pairs) based on the above principle. Specific embodiments will be described below.

1) One E-CCE is configured by selecting two subsets from one PRB pair and combining the selected subsets, and another E-CCE is configured using another PRB pair. An E-PDCCH is transmitted in these two E-CCEs, thereby maintaining the frequency diversity order of 2 even at aggregation level 2.

2) One E-CCE is configured by selecting subset a from PRB pair 1 and subset b from PRB pair 2 and another E-CCE is configured by selecting subset c from PRB pair 1 and subset d from PRB pair 2. An E-PDCCH is transmitted in these two E-CCEs. Particularly, subset a of PRB pair 1 and subset b of PRB pair 2 may be identical to subsets that are configured for an E-CCE with aggregation level 1 for a frequency diversity gain.

To minimize resources occupied by an E-PDCCH, a certain relationship may be established between the subsets of two E-CCEs for use in transmitting an E-PDCCH with aggregation level 2. For example, the union of subsets extracted from PRB pair 1 and PRB pair 2 for a corresponding E-PDCCH is eventually maintained the same by regulating that subset indexes a=c and subset indexes b=d.

The same operation principle may apply between aggregation level 2 and aggregation level 4. That is, if a frequency diversity order of 4 is needed at aggregation level 2, an E-PDCCH having two E-CCEs configured with one subset extracted from each of four PRB pairs is transmitted in the four PRB pairs. On the other hand, given aggregation level 4, an E-PDCCH having four E-CCEs with two subsets extracted from each of the four PRB pairs may be transmitted in the four PRB pairs in order to maintain the frequency diversity order of 4 without increasing it.

Consequently, if one E-CCE is configured with N subsets, a frequency diversity order of $L_1 \times N$ is achieved by selecting each of $L_1 \times N$ subsets from a different PRB pair, for a maximum frequency diversity at a low aggregation level $L_1$ for which a small number of subsets are used. On the other hand, a plurality of subsets are selected from the same PRB pair at a high aggregation level $L_2$ for which many subsets are used. Thus, the number of PRB pairs involved in transmission of a corresponding E-PDCCH is limited to a predetermined value K and K is set to be larger than $L_1 \times N$ and smaller than $L_2 \times N$.

To increase resource utilization, a subset unused for transmission of a specific E-PDCCH is used for transmission of another E-PDCCH or a PDSCH. For example, if subset A is used for E-PDCCH 1 in a specific PRB, subset B of the same PRB may be used for E-PDCCH 2. In this case, E-PDCCH 2 may be transmitted to the same UE that receives E-PDCCH 1. Then it is possible to use the same antenna port and a Scrambling ID (SCID) for E-PDCCH 1 and E-PDCCH 2. For example, two E-PDCCHs carrying a DL assignment and a UL grant are transmitted to the same UE.

In contrast, E-PDCCH 2 may be transmitted to another UE. In this case, a DM-RS of E-PDCCH 2 should be distinguished from a DM-RS of E-PDCCH 1 by a different antenna port and/or a different SCID. For this purpose, an antenna port or an SCID may be preset for each subset. Meanwhile, if subset A is used for E-PDCCH 1 in a specific PRB, subset B of the same PRB may be used for a PDSCH.

However, since a UE should be able to know that subset A is not used for the PDSCH during decoding of the PDSCH, subset B may be used only for the PDSCH of the UE to which DL assignment information is transmitted in subset A (more generally, subset B may be used only for the PDSCH of the UE to which the DL assignment information is transmitted in a part of REs of the corresponding PRB). Or in consideration of the possibility of subset B being used for an E-PDCCH of another UE, even though DL assignment information is received in subset A and schedules a corresponding PRB pair, a PDSCH may not be transmitted in subset B. That is, a PDSCH is transmitted only in a PRB of the second slot in the example of FIG. 11.

Another method of configuring a subset is to define resources for one E-PDCCH, that is, a subset for the E-PDCCH by mapping available REs in a time-first manner.

Figure 15:
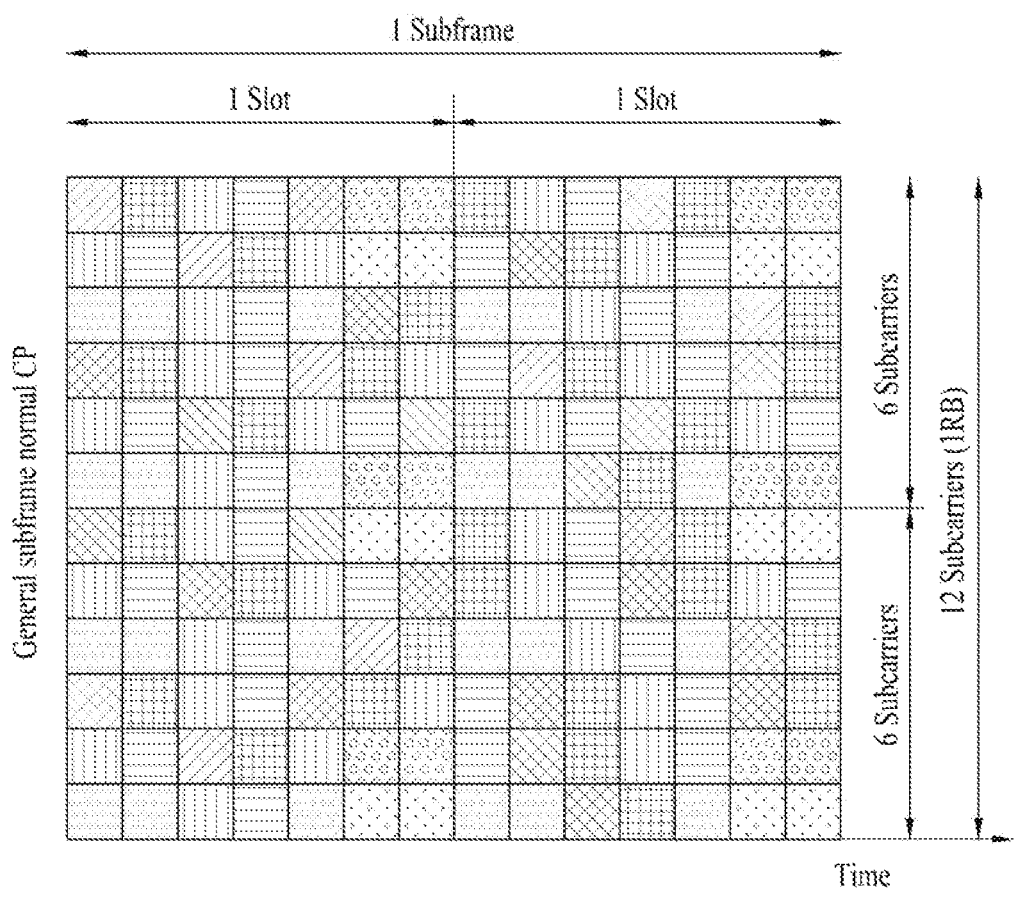
FIG. 15 illustrates REs occupied by an E-PDCCH in one PRB according to another embodiment of the present invention.

FIG. 15 illustrates an example of REs occupied by an E-PDCCH in one PRB according to another embodiment of the present invention. Particularly, if one E-PDCCH uses the two slots of one subframe, a single PRB pair is divided into four subsets and it is assumed that no symbol is used for a PDCCH, in FIG. 15.

Referring to FIG. 15, because OFDM symbols 0 and 1 at subcarrier 0 are used for CRSs, they are not allocated to a subset. Available REs at subcarrier 0 are allocated to the subsets in such a manner that a first available RE, OFDM symbol 2 at subcarrier 0 is allocated to subset A and OFDM symbol 3 at subcarrier 0 is allocated to subset B. If all of the available REs at subcarrier 0 are allocated to the subsets, the same operation is performed regarding the next subcarrier, subcarrier 1.

Compared to the frequency-first subset configuration scheme, the time-first subset configuration scheme is advantageous in that the positions of subcarriers occupied by each subset can be effectively randomized Particularly, the randomization effect is helpful in maintaining the channel estimation performance of each subset uniform. This is because a subcarrier at a border of one PRB is relatively remote from DM-RSs inside the PRB and thus interpolation of channel estimates for the subcarrier may be more difficult.

As illustrated in FIG. 15, a specific subset may be concentrated in a specific OFDM symbol. For example, 8 REs out of the total 12 REs of OFDM symbol 2 are allocated to subset A. As a result, only the specific subset is vulnerable to time selective interference.

To overcome this problem, subsets may be divided in the manner illustrated in FIG. 15, with a different cyclic shift offset applied to each subcarrier. For example, RE partitioning may be performed by applying an offset of n OFDM symbols to subcarrier n. Such an example is illustrated in FIG. 16.

Figure 16:
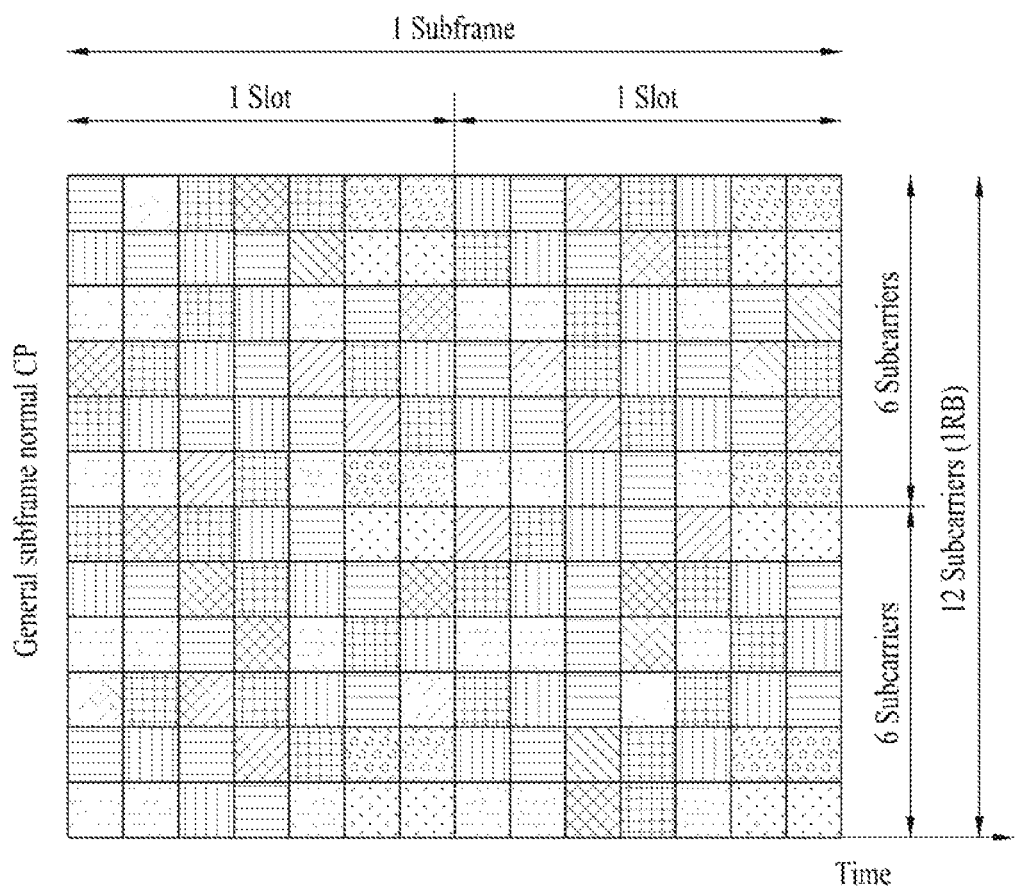
FIG. 16 illustrates an example of applying a different cyclic shift to each subcarrier in the illustrated case of FIG. 15 according to an embodiment of the present invention.

FIG. 16 illustrates an example of applying a different cyclic shift offset to each subcarrier in the case of FIG. 15 according to an embodiment of the present invention.

Referring to FIG. 16, each RE is shifted backward by one symbol at subcarrier 1 in allocating RES to the subsets. Therefore, an RE allocated to subset B in the last symbol (i.e. symbol 11) in FIG. 15 is allocated to subset A due to a cyclic shift offset in the RE partitioning of FIG. 16. Instead, the first symbol (i.e. symbol 0) is allocated to subset B due to cyclic shifting of OFDM symbol indexes in subset partitioning.

Figure 17:
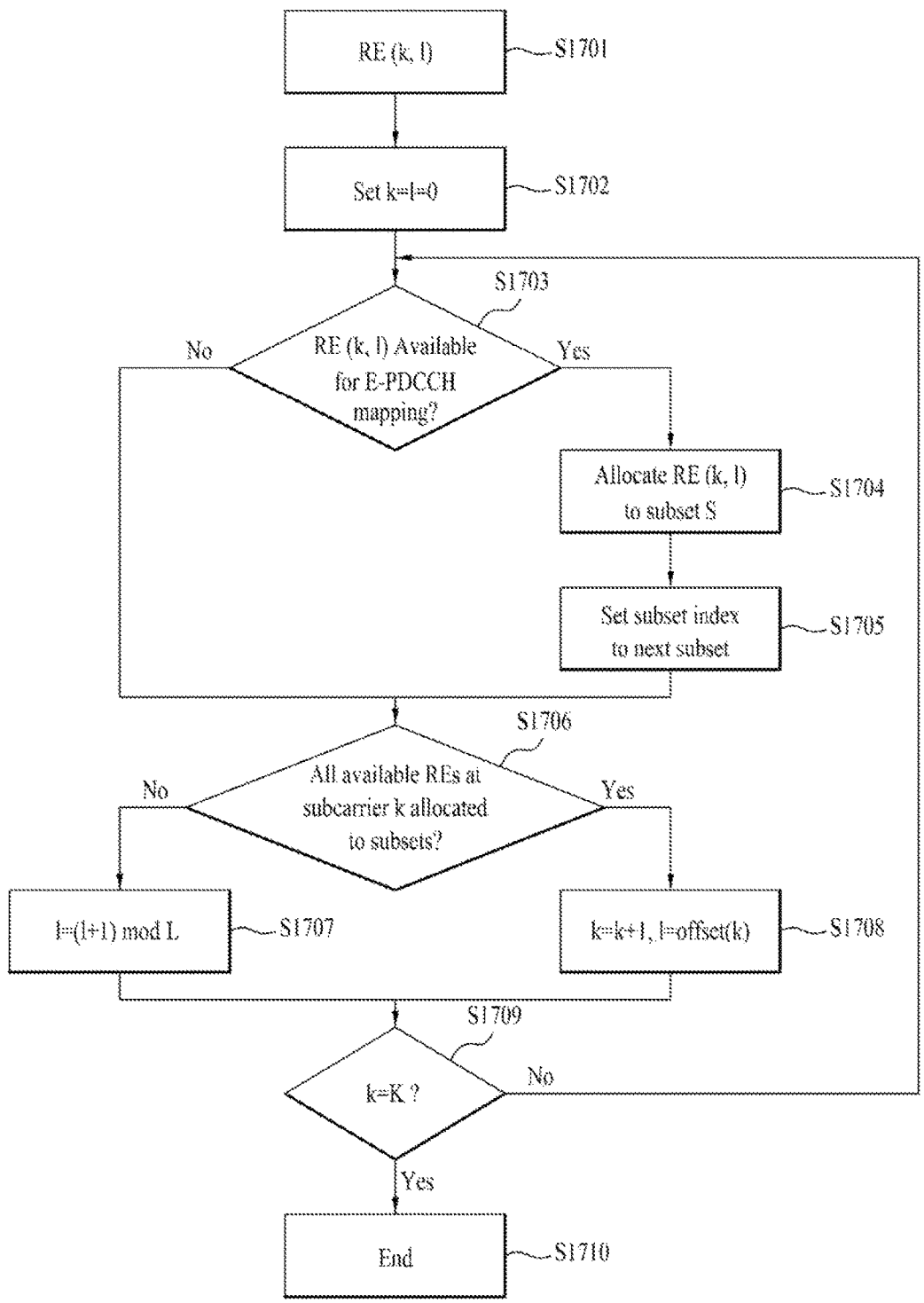
FIG. 17 is a flowchart illustrating a method for allocating REs to an E-PDCCH according to an embodiment of the present invention.

FIG. 17 is a flowchart illustrating a method for allocating REs to an E-PDCCH according to an embodiment of the present invention. Particularly, FIG. 17 illustrates an example in which a cyclic shift is applied to each subcarrier in order to make OFDM symbols of subsets uniform in the time-first subset configuration scheme.

Referring to FIG. 17, a subset configuration operation for RE (k, 1) is considered in operation 1701. The index (k, 1) represents an RE at subcarrier k in OFDM symbol 1. K and L are the number of subcarriers and the number of OFDM symbols respectively in one PRB (or one PRB pair). Then the index (k, 1) is set to (0, 0) in operation 1702.

In operation 1703, it is determined whether RE (k, 1) is an available RE for E-PDCCH mapping. If RE (k, 1) is an available RE for E-PDCCH mapping, RE (k, 1) is allocated to subset S in operation 1704 and the subset index S is set to the next subset index in operation 1705.

On the other hand, if RE (k, 1) is not available for E-PDCCH mapping or the subset index S has been set to the next subset index, it is determined whether all available REs at subcarrier k have been allocated to subsets in operation 1706.

If there remains any RE to be allocated to a subset at subcarrier k, the OFDM symbol index 1 is increased due to the time-first subset configuration in operation 1707. On the contrary, if all available REs at subcarrier K have been allocated to subsets, the subcarrier index k is increased by 1, with an offset applied to the symbol index in operation 1708. Preferably, the offset has the increased subcarrier index as a factor. For example, an offset of k OFDM symbols may be applied to subcarrier k (i.e. offset(k)=k) as illustrated in FIG. 16.

Finally, it is determined whether the subcarrier index is equal to the number K of subcarriers in one PRB (or one PRB pair) in operation 1709. If the subcarrier index is K, this means that all available REs at all subcarriers have been allocated to the subsets. Thus, the procedure ends in operation 1710.

Figure 18:
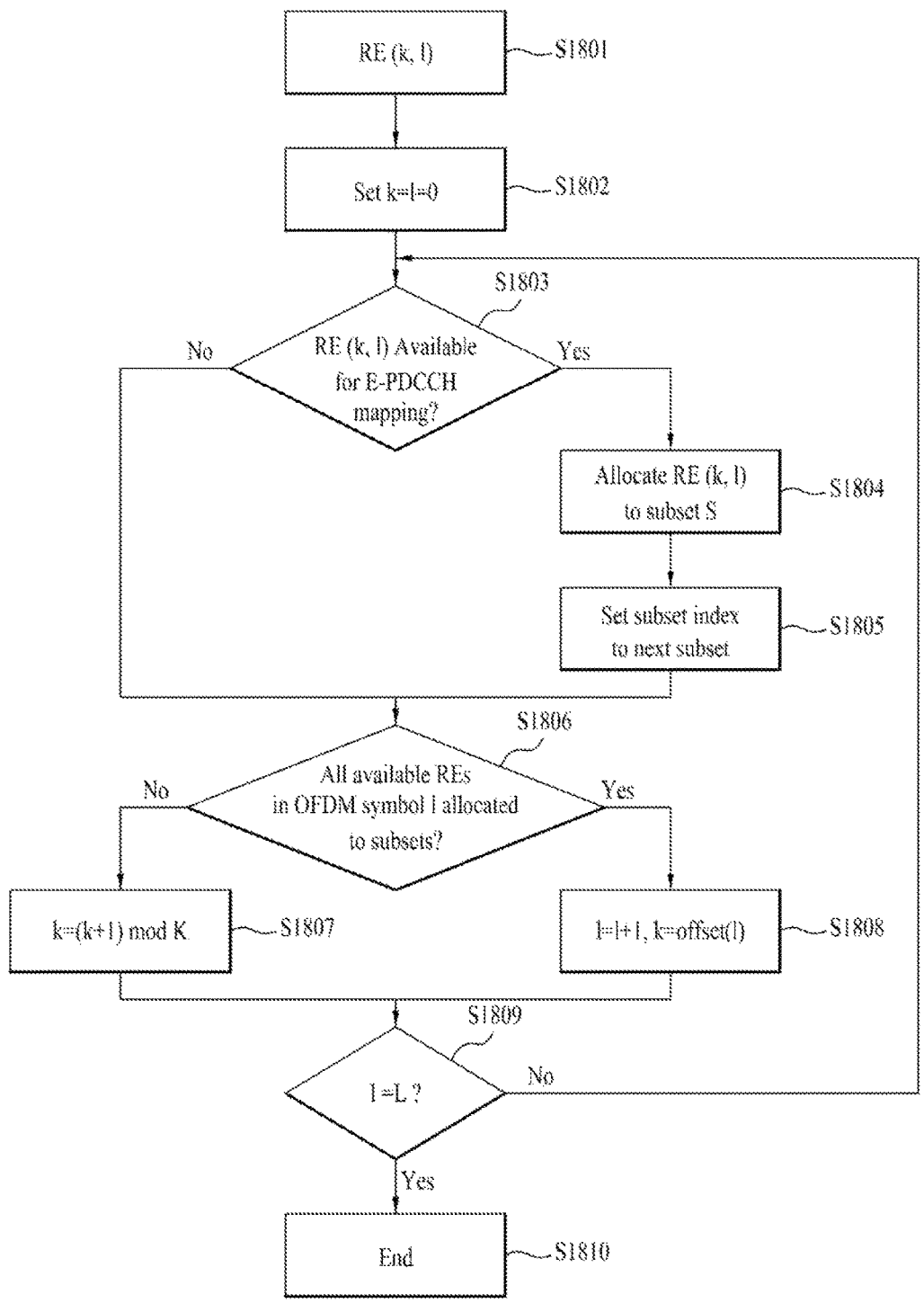
FIG. 18 is a flowchart illustrating a method for allocating REs to an E-PDCCH according to another embodiment of the present invention.

FIG. 18 is a flowchart illustrating a method for allocating REs to an E-PDCCH according to another embodiment of the present invention. Particularly, FIG. 18 illustrates an example in which a cyclic shift is applied to each OFDM symbol in order to make subcarriers of subsets uniform in the frequency-first subset configuration scheme.

Referring to FIG. 18, a subset configuration operation for RE (k, 1) is considered in operation 1801. The index (k, 1) represents an RE at subcarrier k in OFDM symbol 1. K and L are the number of subcarriers and the number of OFDM symbols respectively in one PRB (or one PRB pair). Then the index (k, 1) is set to (0, 0) in operation 1802.

In operation 1803, it is determined whether RE (k, 1) is an available RE for E-PDCCH mapping. If RE (k, 1) is an available RE for E-PDCCH mapping, RE (k, 1) is allocated to subset S in operation 1804 and the subset index S is set to the next subset index in operation 1805.

On the other hand, if RE (k, 1) is not available for E-PDCCH mapping or the subset index S has been set to the next subset index, it is determined whether all available REs in OFDM symbol 1 have been allocated to subsets in operation 1806.

If there remains any RE to be allocated to a subset in OFDM symbol 1, the subcarrier index k is increased due to the frequency-first subset configuration in operation 1807. On the contrary, if all available REs in OFDM symbol 1 have been allocated to subsets, the OFDM symbol 1 is increased by 1, with an offset applied to the subcarrier index in operation 1808. Preferably, the offset has the increased OFDM symbol index as a factor. For example, an offset of 1 subcarriers may be applied to OFDM symbol 1 (i.e. offset(1)=1).

Finally, it is determined whether the OFDM symbol index is equal to the number L of OFDM symbols in one PRB (or one PRB pair) in operation 1809. If the OFDM symbol index is L, this means that all available REs in all OFDM symbols have been allocated to the subsets. Thus, the procedure ends in operation 1810.

If a plurality of cells transmit E-PDCCHs in the same PRB pair, mutual interference occurs between the E-PDCCHs. If both cells use the same REs in each subset, the moment one cell uses a specific subset, all REs of the subset in the neighbor cell are interfered, thereby degrading performance. On the other hand, even though one cell uses a specific subset, if corresponding REs are distributed uniformly to other subsets from the perspective of the neighbor cell, interference between subsets may be uniform.

When an appropriate offset is assigned to prevent REs of each subset from concentrating in a specific subcarrier or an OFDM symbol, use of a different subset mapping scheme for each cell may bring an additional effect of mitigating interference between E-PDCCHs.

For this purpose, each adjacent cell may set a different offset for OFDM symbols or subcarriers and signal its configuration to a UE by a higher-layer signal such as an RRC signal, so that the subset configuration of each adjacent cell may be differentiated. That is, offset(k) or offset(1) is determined by a higher-layer signal such as an RRC signal in the operation of FIG. 17 or FIG. 18.

Or a different starting position of RE-subset mapping is set for each adjacent cell so that REs may be mapped differently in each adjacent cell. For example, while REs are mapped, starting with the first RE by setting the indexes k and 1 to an initial value 0 in FIG. 18, the RE mapping may start at a specific RE (k_init, 1_init) indicated by a higher-layer signal. In addition, the offset may be changed according to a UE ID, the index of a PRB pair, or a subframe number to diversify an RE mapping pattern.

Once REs are determined for each subset in the afore-described methods, the REs are mapped to subsets used for an E-PDCCH signal. The E-PDCCH signal may be mapped to the REs in the orders used in the afore-described subset configuration schemes or in a time-first or frequency-first manner after subsets are configured in the afore-described subset configuration schemes. Or after the E-PDCCH signal is first mapped to a virtual RE set including a predetermined number of REs, the virtual RE set may be processed appropriately through interleaving or permutation and mapped to a physical RE set.

Now, a detailed description will be given of a method for using a subset unused for E-PDCCH transmission in a PRB pair, for PDSCH transmission, when an embodiment of the present invention is implemented. An E-PDCCH signal may include an Enhanced PHICH (E-PHICH) carrying an ACK/NACK for a PUSCH transmission of a UE.

An eNB transmits information about the position of an E-PDCCH (or E-PHICH) that may be multiplexed with a PDSCH to a UE by higher-layer signaling such as RRC signaling. The position information may include information about a set of PRB pairs carrying (or which may carry) the E-PDCCH (or E-PHICH) and information about subsets in each PRB pair. The UE may determine what subset of what PRB pair carries (or may carry) the E-PDCCH or the E-PHICH based on the received information. Therefore, if a specific UE is allocated a PDSCH in a PRB pair where an E-PDCCH or an E-PHICH may exist, the UE decodes the PDSCH, assuming that the PDSCH is not mapped to subsets where the E-PDCCH or the E-PHICH may exist.

Particularly, this method is effective in the case where an E-PDCCH or an E-PHICH is divided into small units such as REGs and cross-interleaved. This is because if a specific subset carries the E-PDCCH or the E-PHICH, the specific subset is highly probable to include an E-PDCCH or an E-PHICH for a UE and thus resource collision is prevented simply by not using the subset for a PDSCH. If a subset occupied by the E-PDCCH or the E-PHICH is given as a specific subcarrier or a specific OFDM symbol, the PDSCH is not mapped to the subcarrier or the OFDM symbol in a PRB pair where the E-PDCCH or the E-PHICH may exist.

If an E-PDCCH (or E-PHICH) is multiplexed with a PDSCH in the same PRB pair, DM-RSs should be distributed appropriately. In the current LTE system, DM-RSs of a PDSCH use antenna ports 7, 8, . . . , 7+R−1 in this order according the rank R of the PDSCH (exceptionally, if the rank of the PDSCH is 1, one of antenna ports 7 and 8 is selected according to an indicator included in DCI). Therefore, to still use an existing DM-RS using scheme for a PDSCH, it is preferable to use a DM-RS port with a largest index from among available DM-RS ports, for an E-PDCCH or an E-PHICH transmitted in the same PRB pair.

For example, if four orthogonal DM-RS ports are defined in the same PRB pair, an E-PDCCH or an E-PHICH is set to use port 10 and a PDSCH is set to use ports 7, 8, and 9. In this case, if the PDSCH is included in the PRB pair in which the E-PDCCH or the E-PHICH may exist, up to rank 3 is available to the PDSCH. In addition, since DM-RS port 10 should be used for the E-PDCCH or the E-PHICH, if the UE decodes the PDSCH in the PRB pair in which the E-PDCCH or the E-PHICH may exist, the UE should assume that an RE corresponding to DM-RS port 10 is always occupied.

If the E-PDCCH or the E-PHICH uses two ports, ports 9 and 10 are available to the E-PDCCH or the E-PHICH. In this case, if the PDSCH includes the PRB pair, up to rank 2 is available to the PDSCH. Then the UE should assume that REs corresponding to DM-RS ports 9 and 10 are always occupied.

If the E-PDCCH or the E-PHICH uses port 7 or port 8, the PDSCH may be multiplexed with the E-PDCCH or the E-PHICH, with the rank of the PDSCH limited to 1. Despite the constraint on the PDSCH rank, the RE overhead of DM-RS transmission may be reduced.

Meanwhile, the UE may detect PDSCH REs according to a general PDSCH decoding scheme in a PRB pair configured to be free of an E-PDCCH or an E-PHICH (particularly, in the case of cross interleaving).

Now an embodiment of applying the foregoing E-PDCCH mapping method will be additionally described below. While it has been described before that subsets sequentially occupy available REs one by one, the principle of the present invention is also applicable to a case where each subset sequentially occupies a predetermined number of available REs at each time.

Figure 19:
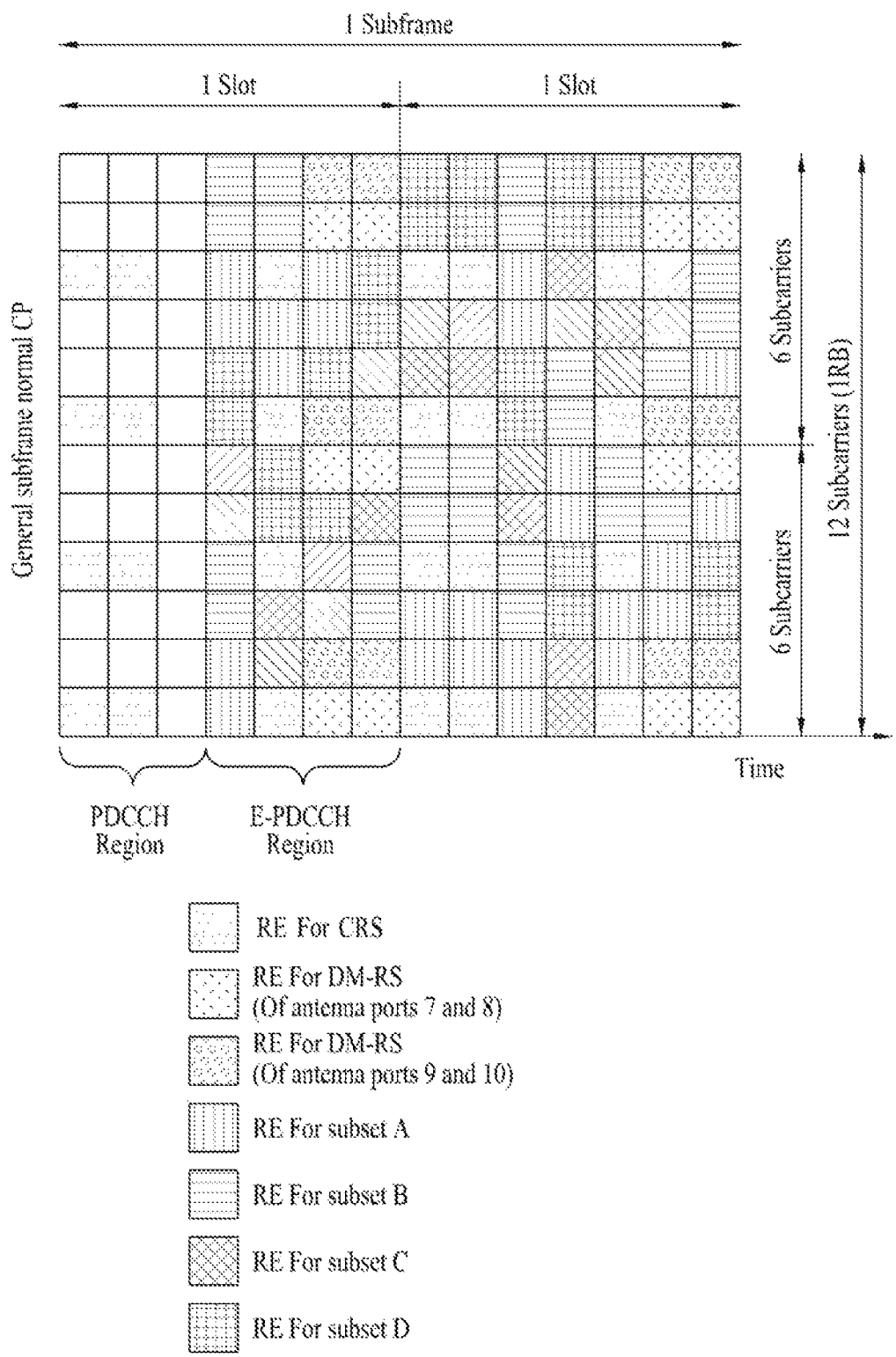
FIG. 19 illustrates an example of applying an E-PDCCH mapping method according to an embodiment of the present invention.

FIG. 19 illustrates an example of applying an E-PDCCH mapping scheme according to an embodiment of the present invention. Particularly, it is assumed in FIG. 19 that all of DM-RSs for antenna ports 7 to 10 exist.

Referring to FIG. 19, each subset occupies two REs in order from the perspective of subcarriers. As described before with reference to FIGS. 17 and 18, an OFDM symbol offset or a subcarrier offset may be assigned.

Depending on whether PRB pairs are to be concatenated, the operation of mapping available REs to subsets sequentially may determine whether to concentrate an E-PDCCH in a PRB pair or distribute the E-PDCCH across a plurality of PRB pairs.

If available REs are sequentially allocated to subsets within one PRB pair as illustrated in FIG. 13, the subsets are confined to the PRB pair. This operation is effective in transmitting a frequency-localized E-PDCCH.

On the other hand, if available REs of a set of concatenated PRB pairs are sequentially allocated to subsets as illustrated in FIG. 14, the subsets are naturally transmitted across a plurality of PRB pairs. This operation is favorable to E-PDCCH transmission with a frequency diversity gain.

Figure 20:
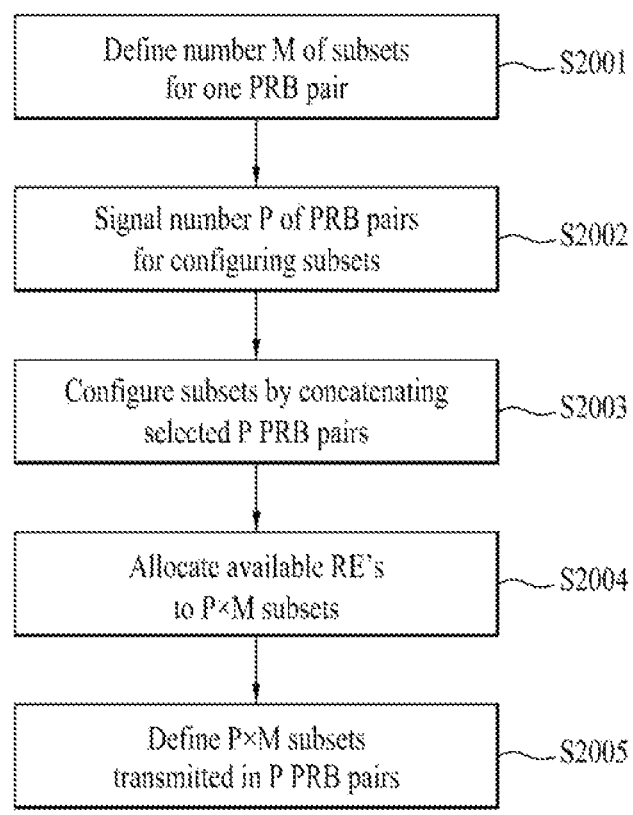
FIG. 20 is a flowchart illustrating a method for converting a frequency-domain localized subset configuration and a frequency restricted subset configuration according to an embodiment of the present invention.

FIG. 20 illustrates a method for converting a frequency-localized subset configuration and a frequency-restricted subset configuration according to an embodiment of the present invention. Particularly, it is assumed in FIG. 20 that M subsets may be configured in each PRB pair in operation 2001.

Referring to FIG. 20, an eNB signals the number of PRB pairs that form subsets by a higher-layer signal in operation 2002. That is, it is indicated whether a single subset is configured with REs of a single PRB pair or REs of a plurality of PRB pairs. The signaling may indicate the number of PRB pairs from which RES are extracted to configure each subset. Herein, it is assumed that a single subset is configured from P PRB pairs.

In operation 2003, the UE selects P PRB pairs from among PRB pairs configured as an E-PDCCH transmission region and configures subsets by concatenating the P PRB pairs. Since P×M subsets in total should be configured using the P concatenated PRB pairs, available REs are allocated sequentially to the P×M subsets in one of the afore-described methods in operation 2004.

As a result, the UE may define P×M subsets transmitted across P PRB pairs and determine resources for an E-PDCCH in operation 2006.

A specific embodiment of sequentially allocating available REs to subsets will be additionally described below.

When available REs are sequentially allocated, the available REs may be affected by the structure of each subframe. For example, on the assumption that a serving cell actually uses CRSs (4-port CRSs in FIG. 16) and DM-RSs (4-port DM-RSs because each of four subsets uses one port), the other REs may be defined as available REs.

CRSs may be affected by a Multicast Broadcast Single Frequency Network (MBSFN) subframe configuration, etc. While no CRS exists in a PDSCH region in a subframe configured as an MBSFN subframe, CRSs exist in both PDCCH and PDSCH regions of any other subframe. If the corresponding subframe exists in a new carrier type different from existing carriers and corresponds to a subframe without any CRS, no CRS exists in any region of the subframe. If the presence or absence of a CRS RE is determined according to a subframe situation as described above, exclusion of CRS REs from available REs and no allocation of the CRS REs to any subset are helpful in maintaining the number of available REs allocated to each subset uniform.

However, this operation requires displacement of available REs according to a subframe. To avoid the resulting complexity, a specific assumption may be taken regarding the presence or absence of CRSs irrespective of actual CRS transmission, and nominal available REs may be determined accordingly and allocated sequentially to subsets.

Such an assumption may be that CRSs are transmitted through a maximum number of ports or no CRS exists. If a specific RE is regarded as available and thus allocated to a specific subset on the assumption of the absence of any CRS, in spite of actual transmission of a CRS in the RE, the UE should perform a reception operation, assuming that an E-PDCCH is not transmitted in the RE.

Such an assumption regarding the presence or absence of an RS and an associated definition of available REs may apply to other RSs. For example, in the case of DM-RS, DM-RS REs may be excluded from available REs on the assumption that maximum DM-RS overhead exists, in order to simplify the available RE definition. Or on the assumption that no DM-RS exists, corresponding REs are regarded as available and allocated to subsets. Then if DM-RSs are actually transmitted, the corresponding REs may be excluded from E-PDCCH reception.

The same operation may apply to CSI-RS. Only REs without CSI-RSs may be regarded as available. Alternatively, available REs are defined on the assumption that no CSI-RS exists and if a CSI-RS is actually transmitted in a specific RE, the transmission of the CSI-RS in the specific RE is indicated to a UE so that the UE may operate appropriately.

Besides, available REs may be defined on a specific assumption regarding the number of symbols occupied by a PDCCH or the number of symbols occupied by the DwPTS of a TDD special subframe. In actual transmission, the UE may exclude corresponding REs from E-PDCCH detection.

In another embodiment of the present invention, sequential allocation of available REs to respective subsets may be limited to a specific OFDM symbol. For example, while the sequential allocation of available REs to subsets may be simple and effective in a symbol carrying a CRS (or a symbol likely to carry a CRS) because other RSs do not exist in the symbol, REs may be allocated to subsets in a symbol without a CRS in any other method because a DM-RS or a CSI-RS exist in the symbol and transmission or non-transmission of these RSs and the number of REs occupied by the RSs are highly likely to be changed. For example, REs may be allocated to subsets in a symbol without any CRS according to an 8-port CSI-RS pattern or a 4-port DM-RS pattern. Specifically, REs under a single 8-port CSI-RS or 4-port DM-RS configuration may be uniformly distributed to each subset in a symbol without any CRS.

Figure 21:
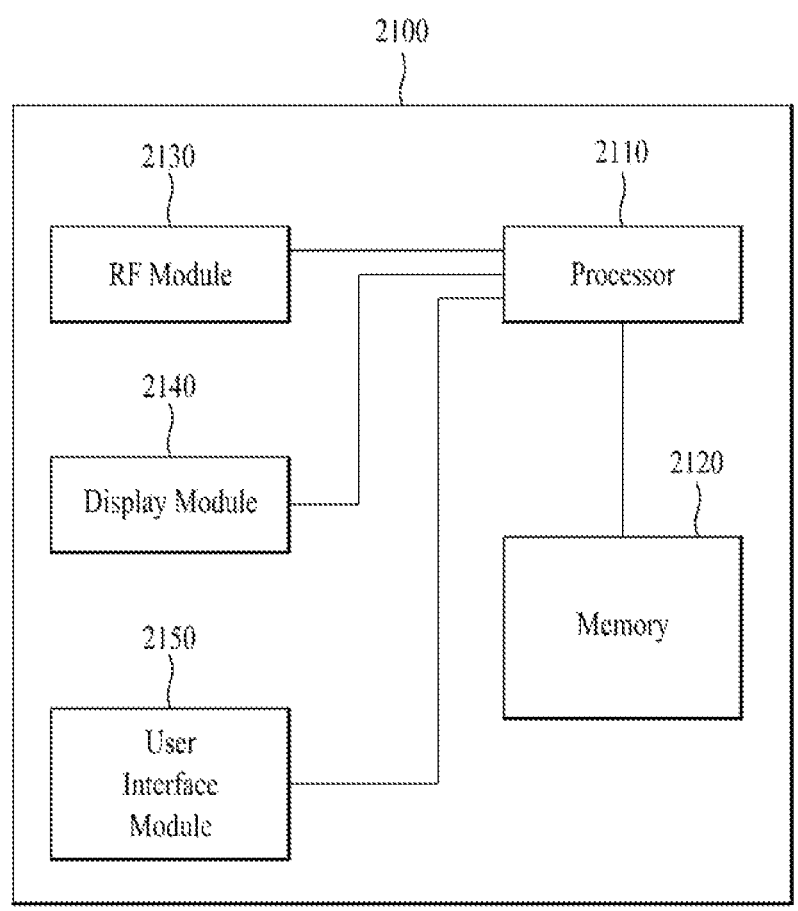
FIG. 21 is a block diagram of a communication apparatus according to an embodiment of the present invention.

FIG. 21 is a block diagram of a communication apparatus according to an embodiment of the present invention.

Referring to FIG. 21, a communication apparatus 2100 includes a processor 2110, a memory 2120, a Radio Frequency (RF) module 2130, a display module 2140, and a User Interface (UI) module 2150.

The communication device 2200 is shown as having the configuration illustrated in FIG. 21, for the convenience of description. Some modules may be added to or omitted from the communication apparatus 2100. In addition, a module of the communication apparatus 2100 may be divided into more modules. The processor 2110 is configured to perform operations according to the embodiments of the present invention described before with reference to the drawings. Specifically, for detailed operations of the processor 2110, the descriptions of FIGS. 1 to 20 may be referred to.

The memory 2120 is connected to the processor 2110 and stores an Operating System (OS), applications, program codes, data, etc. The RF module 2130, which is connected to the processor 2110, upconverts a baseband signal to an RF signal or downconverts an RF signal to a baseband signal. For this purpose, the RF module 2130 performs digital-to-analog conversion, amplification, filtering, and frequency upconversion or performs these processes reversely. The display module 2140 is connected to the processor 2110 and displays various types of information. The display module 2140 may be configured as, not limited to, a known component such as a Liquid Crystal Display (LCD), a Light Emitting Diode (LED) display, and an Organic Light Emitting Diode (OLED) display. The UI module 2150 is connected to the processor 2110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for multiplexing a downlink control channel at a BS in a wireless communication system have been described mainly in the context of a 3GPP LTE system, they are applicable to many other wireless communication systems.

The invention claimed is:

1. A method for transmitting a downlink control channel via one or more resource blocks, the one or more resource blocks consisting of resource elements (REs) reserved for carrying a demodulation reference signal (DMRS) for all antenna ports and other REs, the method performed by a base station in a wireless communication system and comprising:
   transmitting to a user equipment the downlink control channel using one or more resource allocation groups among a plurality of resource allocation groups to a user equipment,
   wherein the plurality of resource allocation groups are configured for the downlink control channel using a predetermined number of RE subsets,
   wherein the predetermined number of RE subsets are only defined from the other REs and exclude only the REs reserved for carrying the DMRS for all of the antenna ports, based on an assumption that any RE reserved for a Cell specific Reference Signal (CRS) or any RE reserved for a Channel Status Information Reference Signal (CSI-RS) does not exist,
   wherein each of the resource blocks includes REs each defined by a symbol index and a subcarrier index,
   wherein the other REs are allocated sequentially to the predetermined number of RE subsets in an order of subcarrier indexes in each of the one or more resource blocks, and
   wherein if all REs defined by one symbol index are allocated, the other REs are allocated sequentially to the predetermined number of RE subsets in an order of subcarrier indexes by a next symbol index.

2. The method of claim 1, wherein, when a number of resource allocation groups used for the downlink control channel is two or more, the two or more resource allocation groups are included in a same resource block.

3. The method of claim 1, wherein, when a number of resource allocation groups used for the downlink control channel is two or more, the two or more resource allocation groups are included in different resource blocks.

4. A base station in a wireless communication system, the base station configured to transmit a downlink control channel via one or more resource blocks, the one or more resource blocks consisting of resource elements (REs) reserved for carrying a demodulation reference signal (DMRS) for all antenna ports and other REs, the base station comprising:
   a transmitter; and
   a processor operatively connected to the transmitter and configured to transmit to a user equipment the downlink control channel using one or more resource allocation groups among a plurality of resource allocation groups to a user equipment, wherein the plurality of resource allocation groups are configured for the downlink control channel using a predetermined number of RE subsets, wherein the predetermined number of RE subsets are only defined from the other REs and exclude only the REs reserved for carrying the DMRS for all of the antenna ports, based on an assumption that any RE reserved for a Cell specific Reference Signal (CRS) or any RE reserved for a Channel Status Information Reference Signal (CSI-RS) does not exist, wherein each of the resource blocks includes REs each defined by a symbol index and a subcarrier index, wherein the other REs are allocated sequentially to the predetermined number of RE subsets in an order of subcarrier indexes in each of the one or more resource blocks, and wherein if all REs defined by one symbol index are allocated, the other REs are allocated sequentially to the predetermined number of RE subsets in an order of subcarrier indexes by a next symbol index.

5. The base station of claim 4, wherein, when a number of resource allocation groups used for the downlink control channel is two or more, the two or more resource allocation groups are included in a same resource block.

6. The base station of claim 4, wherein, when a number of resource allocation groups used for the downlink control channel is two or more, the two or more resource allocation groups are included in different resource blocks.

* * * * *